United States Patent
Shimbashi et al.

(10) Patent No.: US 6,798,779 B1
(45) Date of Patent: Sep. 28, 2004

(54) SYNCHRONOUS COMMUNICATIONS NETWORK TRANSMISSION DEVICE HAVING A SWITCHING CAPABILITY OF AN ASYNCHRONOUS COMMUNICATIONS NETWORK

(75) Inventors: Masahiro Shimbashi, Kanagawa (JP); Noriyasu Matsuno, Acton, MA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/260,350

(22) Filed: Mar. 2, 1999

(30) Foreign Application Priority Data

Jun. 22, 1998 (JP) ............................................ 10-174677

(51) Int. Cl.[7] .................................................. H04J 15/00
(52) U.S. Cl. ................................ 370/395.1; 370/395.5; 370/354
(58) Field of Search ................................ 370/282, 340, 370/345, 358, 359, 360, 391, 395.5, 419, 537, 352, 395, 396, 386, 395.1, 395.51, 395.61, 398, 407, 422, 466, 904, 905, 907, 353, 354

(56) References Cited

U.S. PATENT DOCUMENTS

| | | | | |
|---|---|---|---|---|
| 5,119,370 A | * | 6/1992 | Terry | 370/398 |
| 5,144,297 A | * | 9/1992 | Ohara | 370/359 |
| 5,144,619 A | | 9/1992 | Munter | |
| 5,301,189 A | * | 4/1994 | Schmidt et al. | 370/395.61 |
| 5,365,521 A | * | 11/1994 | Ohnishi et al. | 370/395.51 |
| 5,555,243 A | * | 9/1996 | Kakuma et al. | 370/352 |
| 5,640,512 A | * | 6/1997 | Czerwiec | 370/241 |
| 5,987,026 A | * | 11/1999 | Holland | 370/353 |
| 6,266,333 B1 | * | 7/2001 | Kartalopoulos | 370/466 |
| 6,324,179 B1 | * | 11/2001 | Doshi et al. | 370/395.61 |

FOREIGN PATENT DOCUMENTS

| | | |
|---|---|---|
| GB | 2 263 210 | 7/1993 |
| JP | 1-148007 | 6/1989 |
| WO | 94/03004 | 2/1994 |

* cited by examiner

*Primary Examiner*—Huy D. Vu
*Assistant Examiner*—Justin M. Philpott
(74) *Attorney, Agent, or Firm*—Katten Muchin Zavis Rosenman

(57) ABSTRACT

Data such as STS, DS1, a LAN packet, etc. are converted into STS signals. The STS signals are classified into a signal which is switched by an STS switching module at an STS level, a signal which is switched by a VT switching module and an ATM switching module, and a signal which includes ATM cells. An operator presets whichever STS signal is transmitted to the VT switching module or the ATM switching module, by using a centralized control module, based on network knowledge.

7 Claims, 18 Drawing Sheets

VT SIGNALS AND ATM CELLS ARE REARRANGED TO ANOTHER TIME SLOT BY CROSSCONNECT OR SWITCHING CIRCUIT OF VT AND ATM SWITCHING MODULES

STS-N SIGNAL IS N-MULTIPLEXED SIGNAL, AND SIMILARLY HAS 125 μs CYCLE

SYNCHRONOUS COMMUNICATIONS NETWORK TRANSMISSION DEVICE HAVING A SWITCHING CAPABILITY OF AN ASYNCHRONOUS COMMUNICATIONS NETWORK

BACKGROUND OF THE INVENTION

1. Field of the Invention

The present invention relates to a B-ISDN (Broadband ISDN) transmission device.

2. Description of the Related Art

In a public transmission network, telephony (speech) signals or various data information in an STM (Synchronous Transfer Mode) format are transmitted and handled within the infrastructure of an SDH (Synchronous Digital Hierarchy) or a SONET (Synchronous Optical NETwork). Service signals in the STM format are accessed by each transmission device at a level of an STS (Synchronous Transport Signal: 51.84 MHz) or of a VT (Virtual Tributary: 1.728 MHz), which are the frame formats of SONET. Additionally, an external interface uses a variety of signal formats such as OC-48 (optical signal: 2.4 GHz), OC-12 (optical signal: 600 MHz), OC-3 (optical signal: 150 MHz), DS3 (electric signal: 44.736 MHz), DS1 (electric signal: 1.544 MHz), etc.

Furthermore, data information services in an ATM (Asynchronous Transfer Mode) signal format have been made practical in recent years so as to effectively use the bandwidth of a transmission device or a transmission line. From the viewpoint of future network operations, it is demanded that terminal repeater equipment or an exchange not only carries ATM signals but also can access ATM signals as well as STM signals. That is, an ATM switching capability and diversified data interface capabilities such as 10Base-T, 100Base-T, FrameRelay, DS1-UNI, DS3-UNI, OC3UNI, etc. are required.

For an implementation, new services such as an ATM service, etc. are introduced in stages while using existing services, in most cases. Especially, in a data-service-related industry, devices are used in a variety of ways due to the entries of various service providers. Accordingly, the upgradability and the flexibility of the devices are demanded.

A conventional switching transmission device which can accommodate both the ATM and the STM is disclosed, for example, by the Japanese Patent Laid-Open Publication No. 1-148000. The STM/ATM hybrid switching transmission device disclosed by this publication will be briefly explained below.

FIG. 1 exemplifies the conventional network where the STM and the ATM are mixed.

In this figure, STM and ATM signals can be carried in STS-1×N units over a single optical fiber by an ADM (Add Drop Multiplexer) or by a SONET MUX (SONET Multiplexer), as long as the signals use the SONET frame format as a physical transmission medium. However, an ATM access capability is not included in the conventional network. When a communication between terminals using the ATM is attempted to be made, an ATM exchange must be passed through or an ATM MUX (ATM Multiplexer) must include an ATM switching capability. In this case, however, the bandwidth of a transmission line such as an optical fiber, etc. is wasted, and many terminals and multiplexing devices are required.

That is, when terminals 201 and 202 of FIG. 1, which are ATM terminals, attempt to make a communication, they can make a communication on a path from the terminal 201—an ATM MUX 205—the terminal 202, if the ATM MUX 205 has a switching capability. However, if the ATM MUX 205 does not have a switching capability, the ATM cell transmitted from the terminal 201 must reach a BB exchange (BroadBand exchange) 203 which is an ATM exchange via the ATM MUX 205 and SONET ADM/MUXes 204 and 206 as indicated by a path (1) shown in FIG. 1. The BB exchange switches the ATM cell, which is made to reach the terminal 202 again via the SONET ADM/MUXes 206 and 204 and the ATM MUX 205.

As described above, in the conventional network where the ATM and the STM are mixed, a trunk transmission line must be used for the communication between the terminals 201 and 202, which are connected to the single ATM MUX 205, if the ATM MUX 205 does not have a switching capability. Therefore, the transmission bandwidth of the optical fiber of the trunk line is wasted. Additionally, if the ATM MUX 205 is equipped with the switching capability, its hardware configuration becomes complicated and the cost increases. Furthermore, since all ATM MUXes which accommodate ATM terminals must be equipped with this capability in a similar manner, the cost of the entire network rises.

Explained below is the outline of the conventional STM/ATM hybrid switching transmission device disclosed by the above described publication. For more details, please refer to this publication.

FIG. 2 is a block diagram exemplifying the configuration of the conventional STM/ATM hybrid switching transmission device.

In this figure, 191 indicates a highway and a plurality of highways 191 are arranged. In each of the plurality of highways 191, STM and ATM information are multiplexed. 192 and 193 indicate time slot phase switching units. 195 indicates a time division slot switching device. 197 indicates a time-division switching device. The time-division switching device 197 includes the time slot phase switching units 192 and 193, and the time-division slot switching device 195.

Each of the time slot phase switching units 192 is arranged for each incoming highway 191, while each of the time slot phase switching units 193 is arranged for each outgoing highway 191. These time slot phase switching units 192 and 193 are intended to switch between the phases of time slots of each of the highways 191.

The time-division slot switching device 195 is intended to switch between the time slots of the highways 191.

This time-division slot switching device 195 separates the STM and ATM information, and switches between the time slots of the highways 191 for the STM information. Furthermore, the time-division slot switching device 195 has a capability for multiplexing and switching the STM and ATM information upon receipt of the output from an asynchronous transfer mode information switching device (ATM switching device).

196 indicates an ATM switching device which is intended to switch the ATM information separated by the time-division slot switching device 195 included in the time-division switching device 197.

Since the capacity of the STM switch unit of each time slot phase switching unit 192 and the time-division slot switching device 195, and the capacity of the ATM switch unit of the ATM switching device 196 are fixed in this configuration, the hardware size becomes larger as the respective capacities of the STM and the ATM switch units increase. At the same time, the efficiency decreases. If this configuration is used as an STM or an ATM dedicated machine, it is not cost-effective due to the inclusion of unnecessary portions. Additionally, because the minimum unit of switching is fixed in the STM switch unit, the hardware configuration becomes complicated if switching is attempted to be made also on a low level such as DS1 (1.544 MHz). Furthermore, if a redundant configuration is adopted, the entire hardware must be duplexed. As a result, the reliability degrades because the entire configuration is switched even at the time of the occurrence of a partial problem.

Conventionally, a terminal and an exchange which handle STM and ATM signals are respectively implemented as different devices. There are several methods for handling STM and ATM signal services by combining these devices, and for accessing/switching an STM signal by forcibly putting the STM signal into ATM cells, in the hardware which also accesses also ATM signals.

With the conventional methods, however, a node (device) within a network becomes redundant in order to realize both the coexistence with the network composed of an existing SONET ADM (Add-Drop Multiplexer) for an STM or of an ATM access node/exchange, and the support of various service interfaces of respective devices. As a result, an inefficient network is configured or a device configuration becomes complicated in order to convert an STM signal into ATM cells, which are signals of a different type. Therefore, it is impossible to reduce the size and cost of the device.

Additionally, with the configuration of the STM/ATM hybrid switching transmission device which can switch both STM and ATM signals, such as disclosed by the Japanese Patent Laid-Open Publication No. 1-148000, conventional STM services such as SONET, DS1, DS3, etc., and data services such as 10Base-T, 100Base-T, Frame Relay, etc. are difficult to flexibly support various interfaces of ATM services such as OC3-UNI, DS3-UNI, etc. without leaving a hardware resource unused. Similarly, the balance between the capacities of STM and ATM switches varies depending on a service provider, and changes in large increments. Therefore, the hardware size which satisfies all of the above described requirements becomes larger, so that higher costs and a bigger space for installation are required. Especially, the cost of an ATM switch varies depending on its capacity. Additionally, it is difficult to maintain the compatibility between the STM and the ATM switches also from the viewpoint of maintenance for making STM and ATM accesses.

SUMMARY OF THE INVENTION

An object of the present invention is to provide a compact and low-cost device which accommodates an ATM signal access in an STM accessing device arranged in a conventional STM network while keeping the coexistence with the STM accessing device, efficiently performs STM and ATM signal processes, and can flexibly cope with a service type or a capacity change.

A transmission device according to the present invention includes an interface unit for supporting a synchronous communications network, an asynchronous communications network, and a data service, etc.; a switching unit for switching all or any of the frame level of a synchronous communications network, the frame level of a low layer of the synchronous communications network, and the frame level of an asynchronous communications network; and a centralized control unit for performing various controls including the switching control in the case where the interface and switching units are redundantly configured. Additionally, this transmission device serves as a transmission device dedicated to a synchronous communications network, a transmission device dedicated to an asynchronous communications network, or a synchronous/asynchronous hybrid switching transmission device by combining the interface unit, the switching unit, and the centralized control unit.

According to the present invention, the switching unit switches all or any of the frame level of a synchronous communications network, the frame level of a low layer of the synchronous communications network, and the frame level of an asynchronous communications network. Accordingly, the capability for switching at a frame level of the synchronous communication network is implemented, and at the same time, it becomes possible to make switching in frame units other than the frame level of the synchronous communications network. Here, the frame level of the synchronous communications network is, for example, a SONET STS frame. The frame level of the low layer of the synchronous communications network is, for example, a VT level. The frame level of the asynchronous communications network is an ATM cell level.

Furthermore, there is no need to newly arrange a special interface by using the frame level of a synchronous communications network as a shared interface between the units for switching respective frame levels of the synchronous communications network. Therefore, signal processing can be performed with simple circuitry based on the ITU-T recommendations.

DESCRIPTION OF THE PREFERRED EMBODIMENTS

Figure 1:
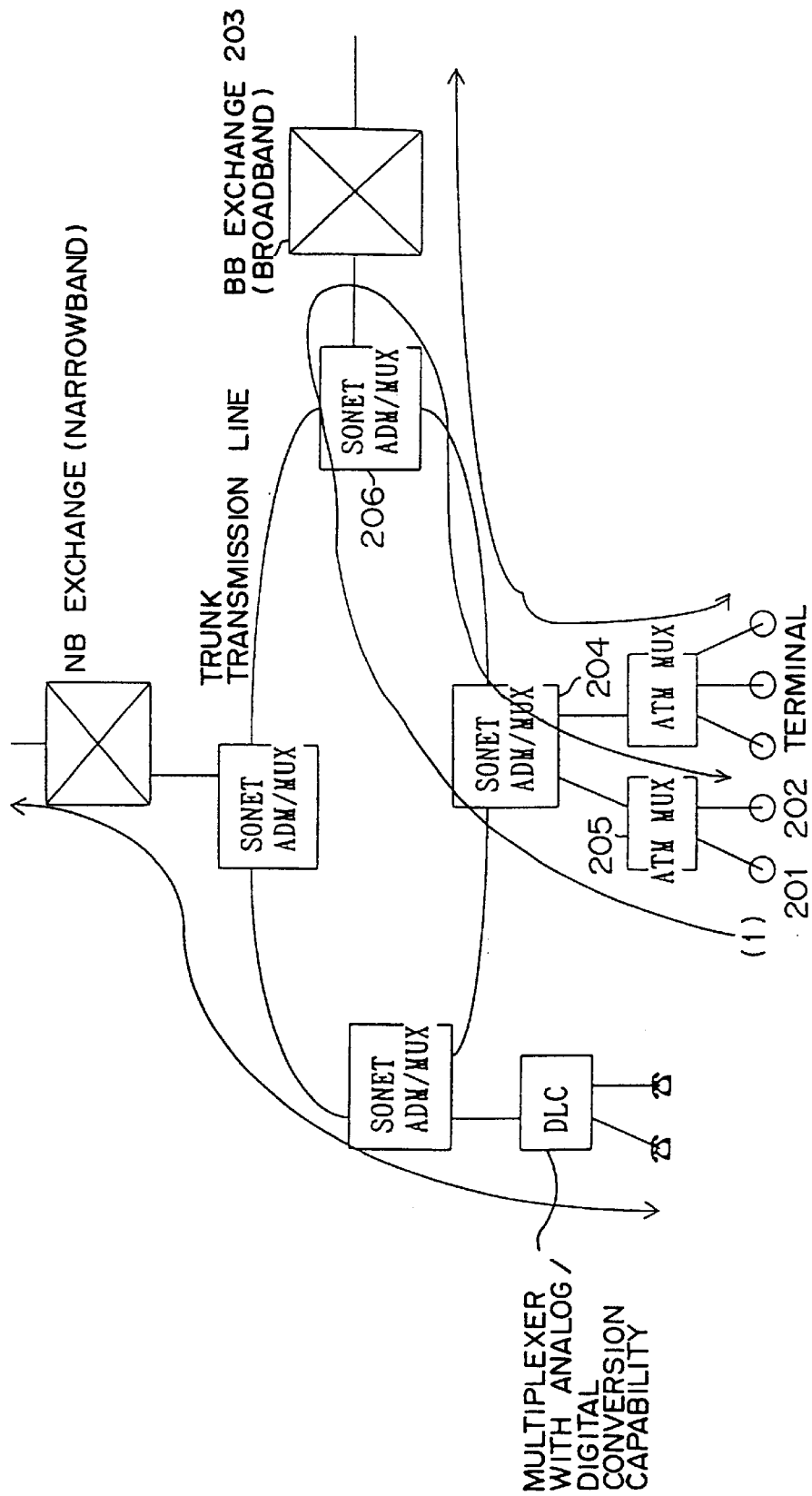
FIG. 1 exemplifies a conventional network where STM and ATM are mixed.
Figure 2:
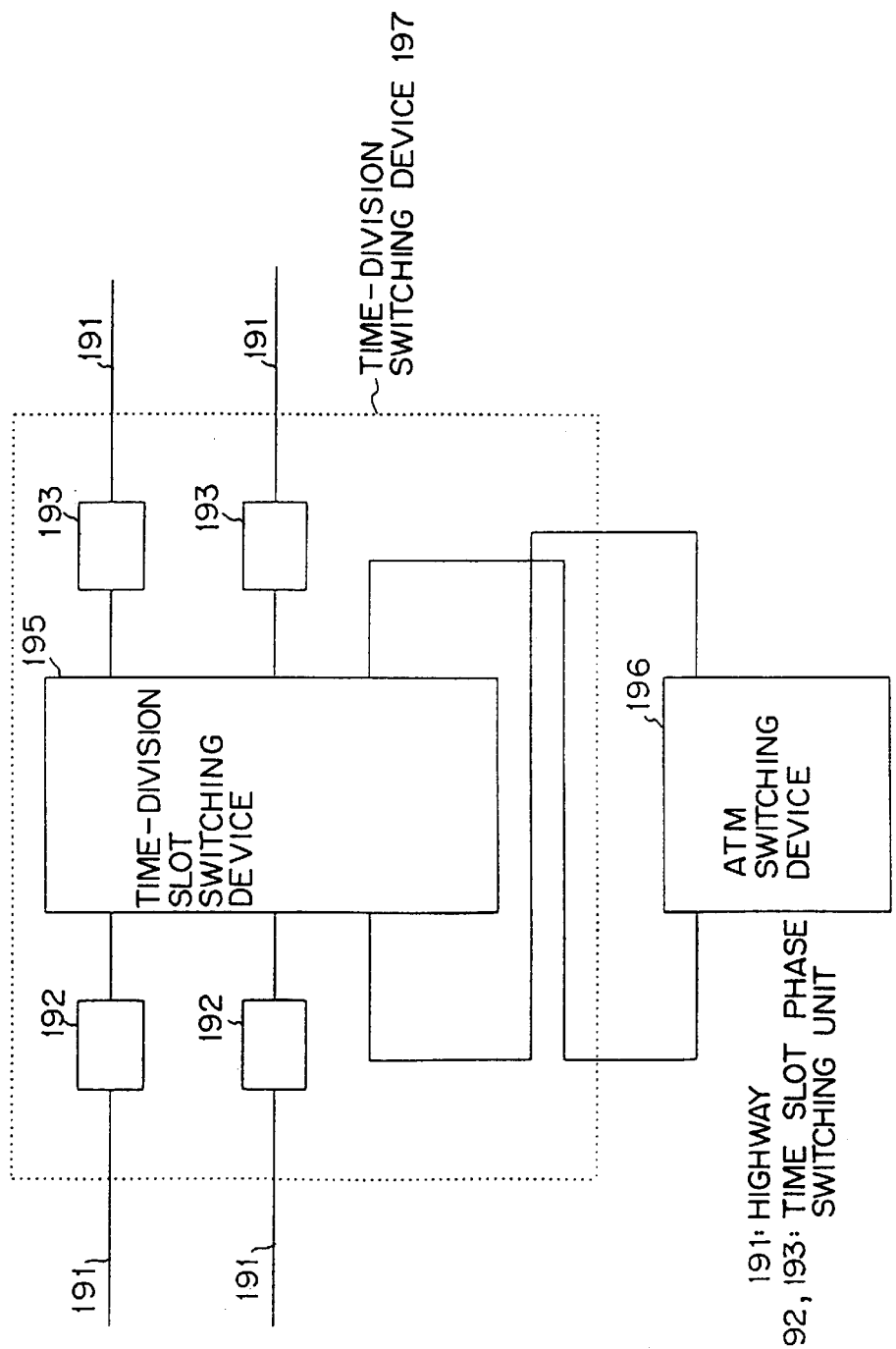
FIG. 2 is a block diagram exemplifying the configuration of a conventional STM/ATM hybrid switching transmission device.
Figure 3:
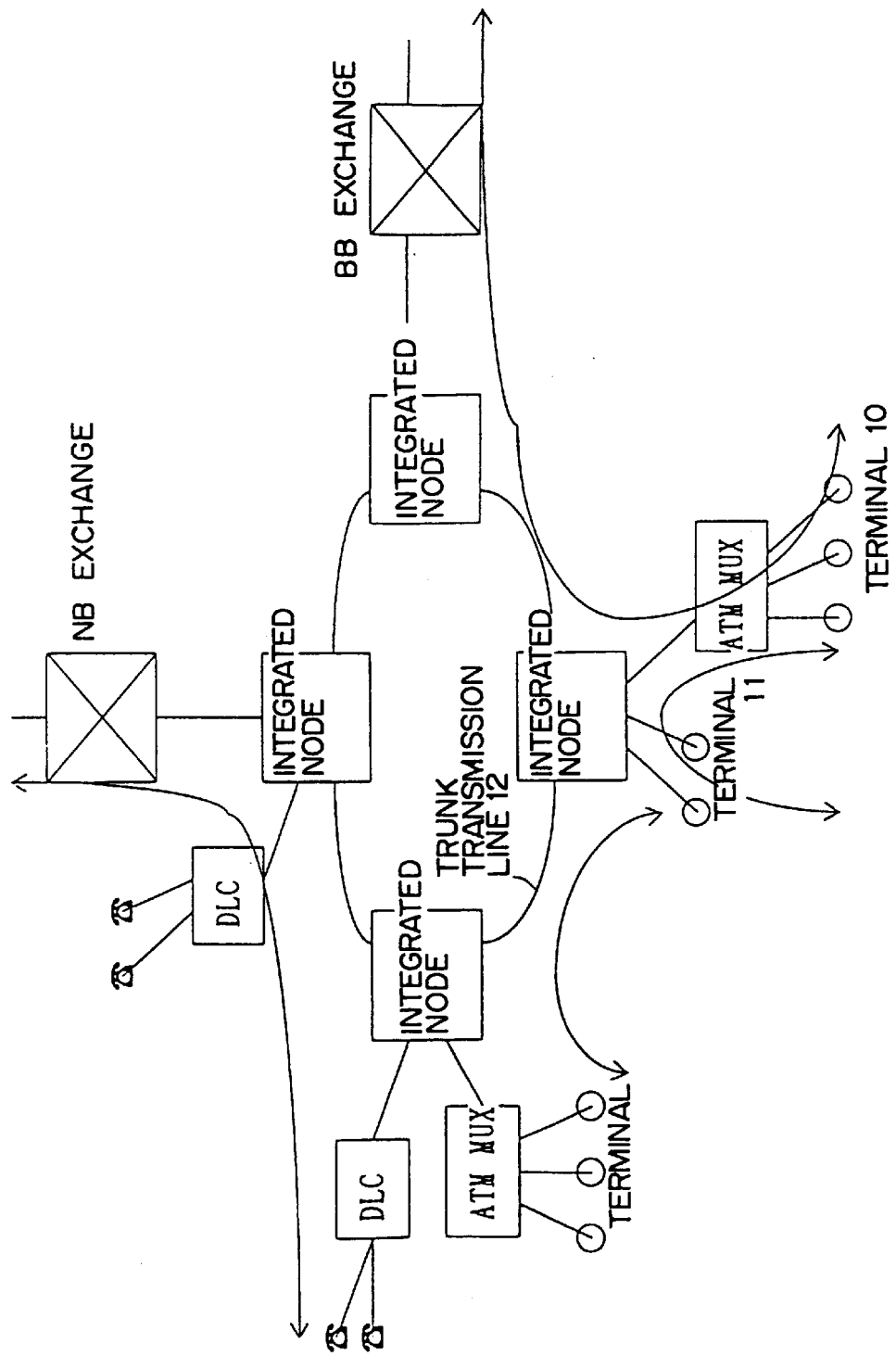
FIG. 3 exemplifies the configuration of the network where a single node includes both STM and ATM switching capabilities according to the present invention.

FIG. 3 is a schematic diagram exemplifying the configuration of the network where a single node includes STM and ATM switching capabilities, according to the present invention.

An integrated node connected to a trunk transmission line shown in FIG. 3 is a node which includes both of the STM and ATM switching capabilities according to the present invention. For example, when terminals 10 and 11, which are ATM terminals, make a communication, the ATM cell from the terminal 10 is input to an integrated node 12 via an ATM MUX. Since the integrated node 12 includes the ATM switching capability, the ATM cell is switched within the integrated node 12. Then, the ATM cell from the terminal 10 can be transmitted to the terminal 11. Since there is no need to pass through a BB exchange, the transmission bandwidth of the trunk line is not wasted. That is, the bandwidth of a transmission line can be effectively used, because an ATM cell within a network can be routed for an ATM service not via an ATM exchange. Furthermore, a single integrated node includes both the STM and the ATM switching capabilities, so there is no need to separately arrange an STM and ATM exchange. As a result, the numbers of nodes and node types, which configure the network that supports both STM and ATM services, can be significantly reduced, thereby realizing a significant reduction in the network cost.

Note that the integrated node can accommodate a narrowband communication as shown in FIG. 3 this may include narrowband ISDN communication, and also a normal analog voice communication by digitizing the communication within a DLC.

Figure 4:
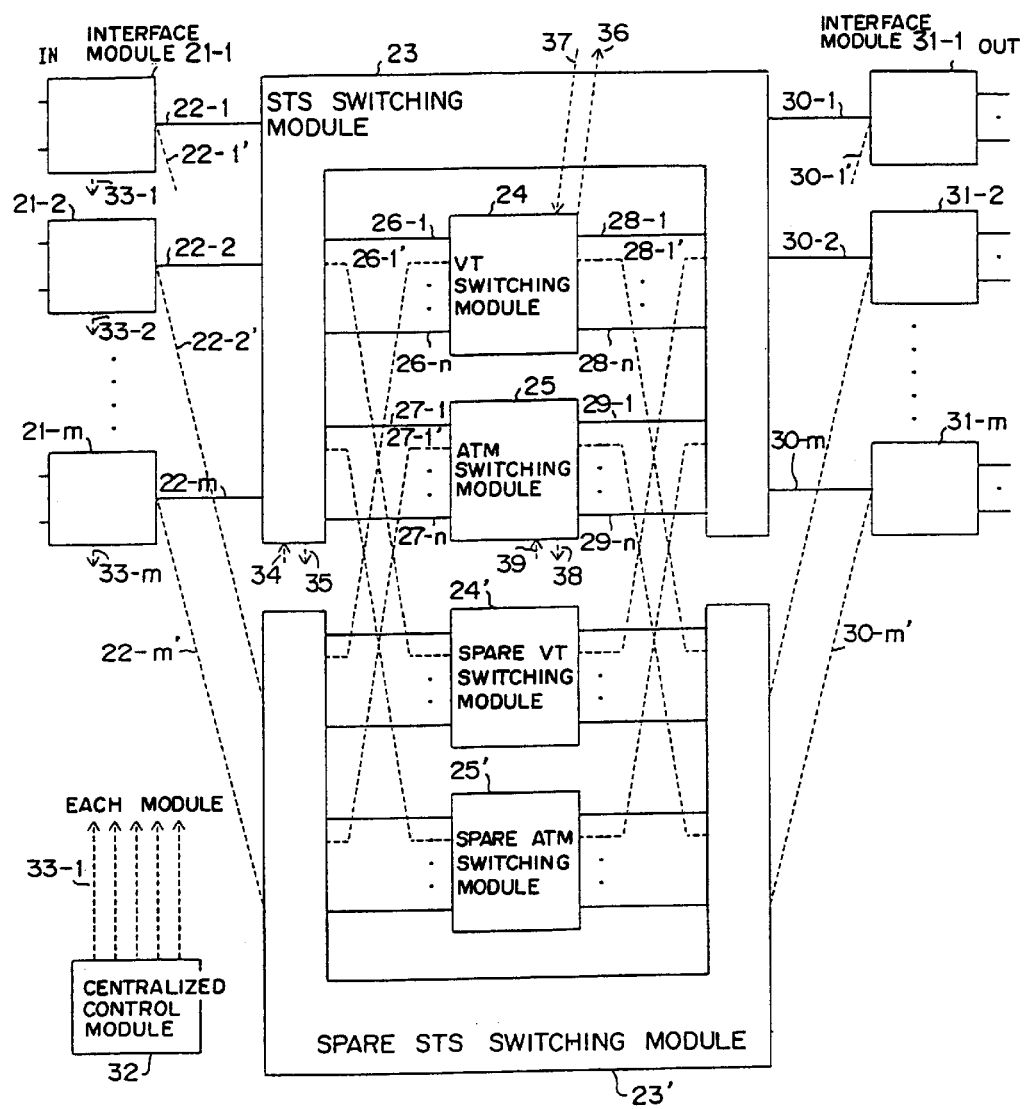
FIG. 4 shows a preferred embodiment of an integrated node according to the present invention.

FIG. 4 shows an integrated node according to a preferred embodiment of the present invention.

The integrated node (STM/ATM accessing device) according to the present invention includes a plurality of interface modules 21-1 through 21-m and 31-1 through 31-m for supporting a plurality of channels and plural types of services; and switching modules 23 through 25 and 23' through 25' for making a SONET STS level access, a VT level access, and an ATM level access.

A variety of externally input signals are terminated by corresponding interface modules among the interface modules 21-1 through 21-m, and are converted into unified inter-module interface signals (such as signals in an STS-12 format: 600 MHz LVDS serial interface signals, etc.). In FIG. 4, each solid line indicates an inter-module interface with an operating STS switching module 23, while each broken line indicates an interface with a spare STS switching module 23'. Both of the interfaces carry identical signals. The details of the operations of an interface module will be described later.

Interface module settings can be made so that a certain pair of interface modules (for example, a pair of 21-3 and 21-4) operate as an operating and a spare module. Another pair (for example, a pair of 21-5 and 21-6) operate as the East and the West sides of a ring. A further pair (for example, a pair of 21-7 and 21-8) independently operate as different signal paths. A centralized control module 32 exists to control these settings. The centralized control module 32 generates a trigger for switching between an operating and a spare module (APS: Automatic Protection Switch) and a trigger for switching a ring path (PSR: Protected Switched Ring) by collecting the fault information of each interface module via shared control paths 33-1 through 33-m, and provides the generated trigger to the STS switching module 23 for actually switching between these paths via a control path 34. The centralized control module 32 also collects the fault information of the shared inter-module interfaces 22-1 through 22-m, which is detected by the STS switching module 23, via a control path 35, and provides the STS switching module 23 with a switching trigger via the control path 34.

The STS switching module 23, which has received a signal from one of the shared inter-module interfaces 22-1 through 22-3, switches the signal according to trigger information if the signal requires to be switched, and crossconnects the signal at an STS-1 level according to setting information. If the signal is a through signal, the STS switching module 23 transmits it to the shared inter-module interfaces 30-1 through 30-m. If the signal requires to be crossconnected at a VT level, the STS switching module 23 transmits it to the shared inter-module interfaces 26-1 through 26-n. If the signal includes ATM cells, it is transmitted to the shared inter-module interfaces 27-1 through 27-n, which perform ATM-switching. Signals 22-1' through 22-m' identical to the signals 22-1 through 22-m are input to a spare STS switching module 23', and are processed in a similar manner as in the operating STS switching module. The internal operations of the STS switching module 23 will be described later.

With the centralized control module 32, an operator who maintains the STM/ATM accessing device according to this preferred embodiment makes path setting, etc. for each module. The centralized control module 32 is, in other words, a control panel.

The VT switching module 24 detects a fault of one of the shared inter-module interfaces 26-1 through 26-n (operating interfaces) and 26-1' through 26-n' (spare interfaces), provides the centralized control module 32 with the information about the fault via a control path 36, and switches between the interfaces 26-i (operating) and 26-i' (spare) (i=1, ... n) upon receipt of a switching trigger. After crossconnecting a signal at a VT level (1.726 MHz), the VT switching module 24 transmits the signal to the shared inter-module interfaces 28-1 through 28-n (operating) and 28-1' through 28-n' (spare).

Additionally, the VT switching module 24 switches the VT frames input from the shared inter-module interfaces 26-1 through 26-n, and outputs them to the shared inter-module interfaces 28-1 through 28-n. The VT frame input to the VT switching module 24 is a VT frame to be output, into which an STS frame is converted within the STS switching module 23. The VT frame output to the shared inter-module interfaces 28-1 through 28-n is input to the STS switching module 23, and is inversely converted into an STS frame.

Also the ATM switching module 25 detects a fault of one of the shared inter-module interfaces 27-1 through 27-n (operating) and 27-1' and 27-n' (spare), switches between them, makes ATM switching (to be described in detail later), and transmits a signal to one of the shared inter-module interfaces 29-1 through 29-n (operating) and 29-1' through 29-n' (spare). Additionally, the ATM switching method uses the self-routing switch, the shared memory, and the shared bus, which are disclosed by the Japanese Patent Laid-Open Publication No. 1-148000.

Both the shared inter-module interfaces 28-1 through 28-n from the operating VT switching modules and the shared inter-module interfaces 28-1 through 28-n' from the spare VT switching modules are input to the STS switching module 23, which switches the signals according to a trigger from the centralized control module similar to the other inter-module interfaces. The STS switching module then crossconnects the signals, and passes them to interface modules 31-1 through 31-m via shared inter-module interfaces 30-1 through 30-m. The signals which are converted into those of the external interfaces are externally transmitted. Note that the interface modules 31-1 through 31-m select either of signals 30-i and 30-i' (i=1 through n), whichever is more suitable.

As the physical layer of a service which handles ATM cells, a frame relay service which uses a LAN signal handling packet of an Ethernet, etc., a DS1/DS3 UNI (User Network Interface), a DS1/DS3 signal, etc. can be cited. Additionally, the case of OC-3UNI using a SONET optical interface, or ATM cells are mapped in STS-1 within an OC-N signal, can be cited.

FIGS. 5 through 10 explain how data frames change at respective points.

Figure 5:
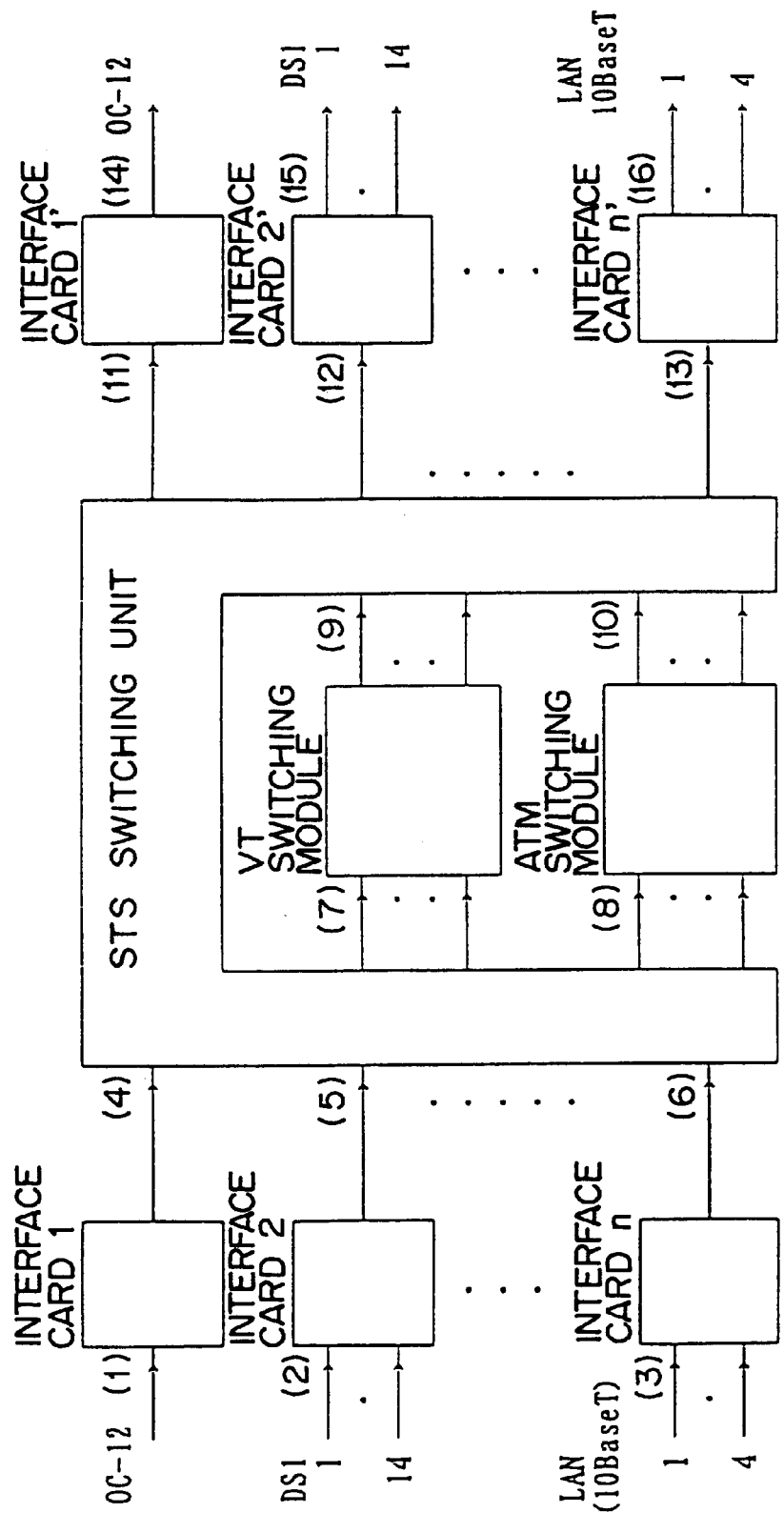
FIG. 5 is a schematic diagram explaining how a data frame changes at each point in the configuration shown in FIG. 2 (No. 1)

FIG. 5 shows and explains the respective points representing the appearances of the data frames in the configuration shown in FIG. 4.

(1) through (3) are points representing the appearances of the data frames in the stages preceding interface cards (modules) 1 through n.

(4) through (6) are points representing the appearances of the data frames after passing through interface cards 1 through n.

(7) and (8) are points representing the appearances of the data frames before being input to a VT or an ATM switching module after passing through an STS switching module. These points exist on shared inter-module interfaces.

Also (9) and (10) are points on the shared inter-module interfaces, which represent the appearances of the data frames after passing through the VT or the ATM switching module.

(11) through (13) are points representing the appearances of the data frames output from the STS switching module, on the shared inter-module interfaces.

(14) through (16) are points representing the appearances of the data frames output from interface cards 1' through n'. The data frames output from the interface cards 1' through n' are output to transmission lines.

Figure 6:
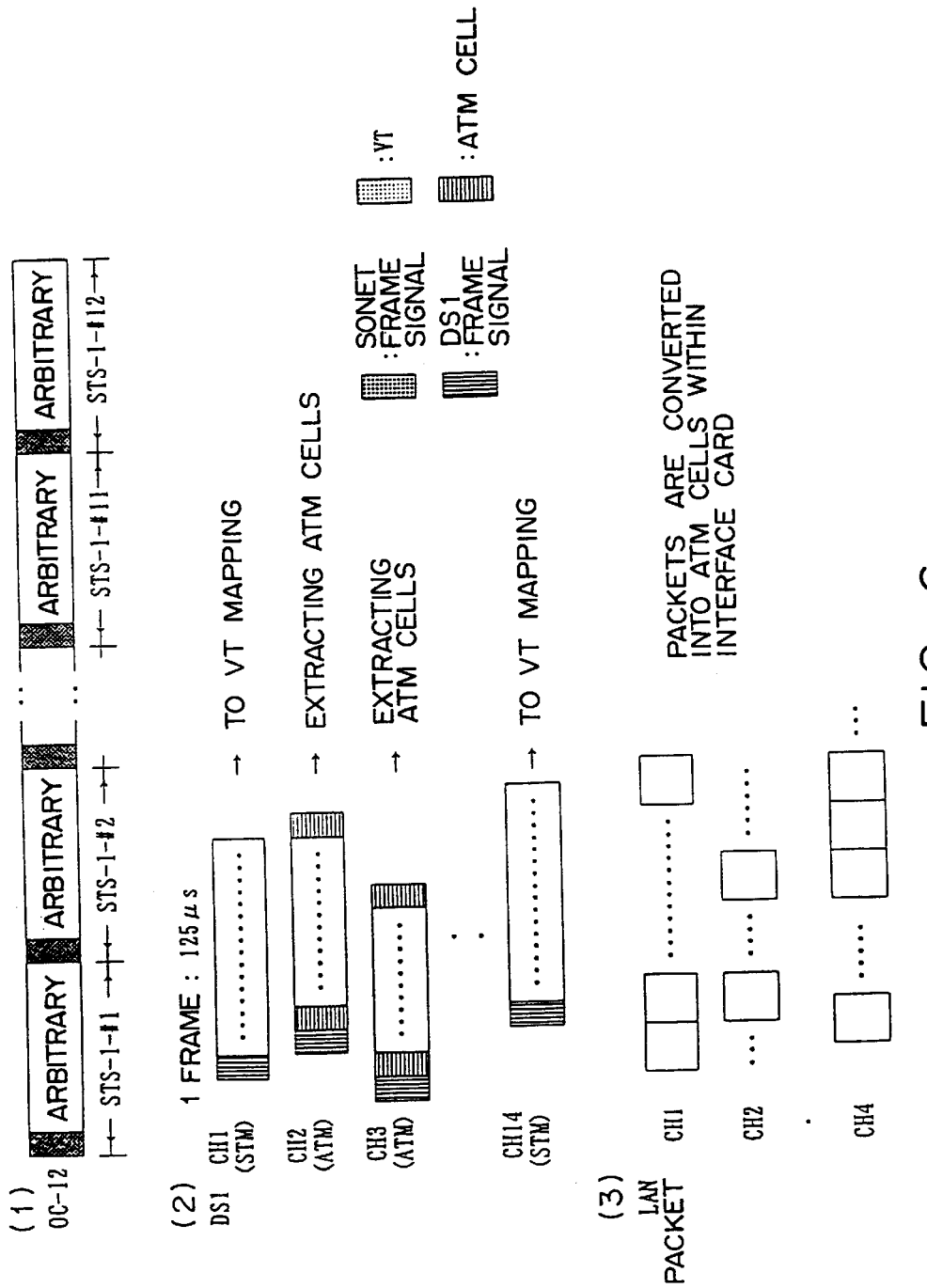
FIG. 6 is a diagram explaining how the data frame changes at each point in the configuration shown in FIG. 2 (No. 2)

FIG. 6 shows the appearances of data frames (No. 1).

(1) shown in this figure illustrates the appearance of the data frame at the point (1) shown in FIG. 3, and shows the case where an STS-1 frame is input to the interface card 1 unchanged. The optical signal used here is assumed to be an OC-12 signal. 12 STS-1 frames are linked so that a single OC-12 data frame is formed.

(2) shown in FIG. 6 illustrates the appearances of the data frames at the point (2) shown in FIG. 5. This shows the case where channels 1 through 14 of a DS1 signal are input to the interface card 2. In this case, frames in various formats can be mapped to a DS1 data frame. In (2) shown in FIG. 6, STM signal frames are included in channels 1 and 14, and ATM cells are mapped to channels 2 and 3. When an STM frame (a DS1 frame in this figure) is transmitted, the STM frame is remapped to a VT frame within the interface card 2. When ATM cells are transmitted, they are extracted from the STM frame.

(3) shown in FIG. 6 illustrates the appearances of the data frames at the point (3) shown in FIG. 3. The interface card n accommodates channels 1 through 4, to which the data packets used for a LAN are input. Because the LAN packets are neither STM nor ATM, they are converted into ATM cells within the interface card n.

Figure 7:
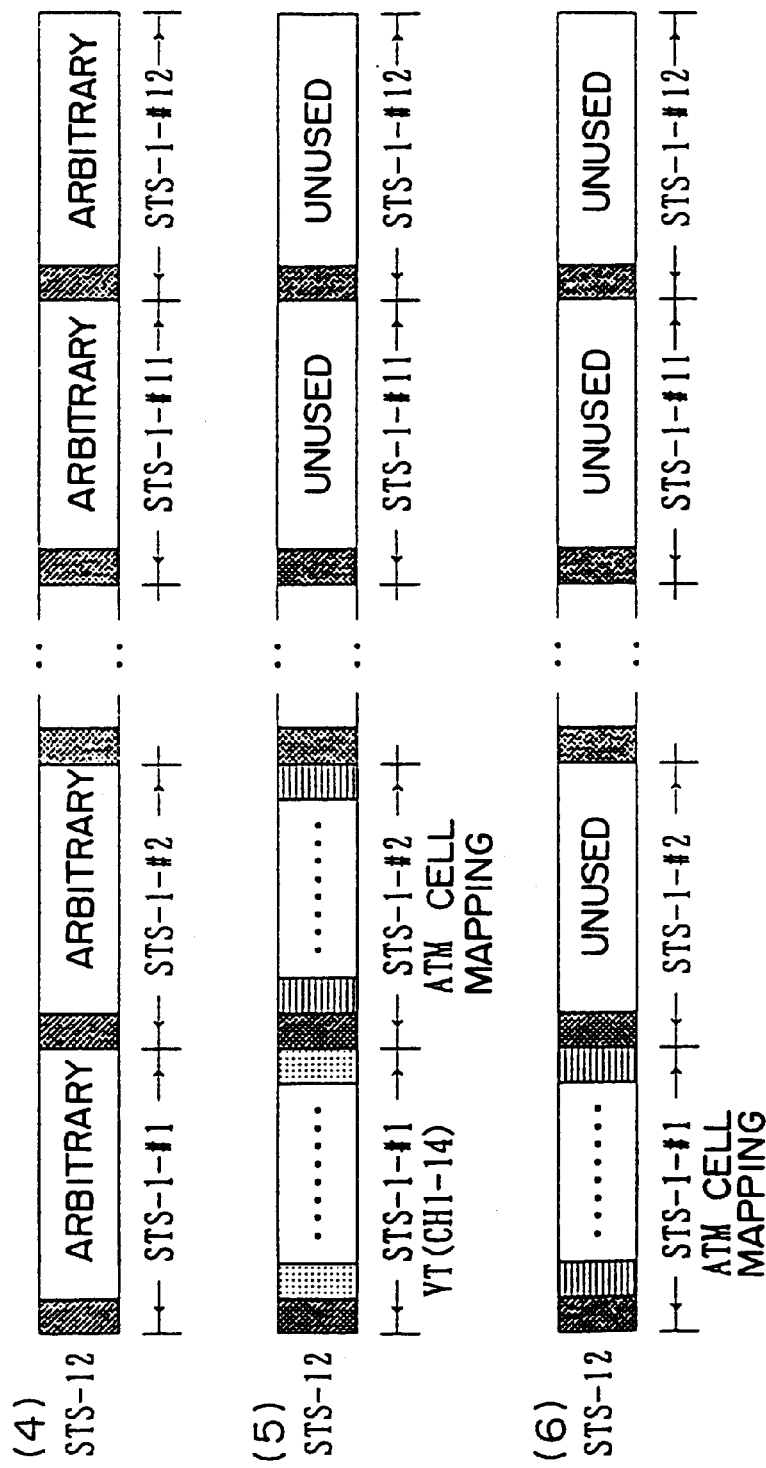
FIG. 7 is a diagram explaining how the data frame changes at each point in the configuration shown in FIG. 2 (No. 3)

FIG. 7 shows the appearances of data frames (No. 2).

Since the data passed through the interface cards 1 through n are input to the STS switching module, all of the data frames are converted into STS frames within the interface cards 1 through n. This figure uses STS-12 frames. Accordingly, each STS-12 frame includes 12 STS-1 frames as shown in (4).

Additionally, as shown in (5) of this figure, the data of channels 1 through 14, which are mapped to VT signals, are inserted into STS-1 frames, and at the same time, ATM cells are mapped to a STS-1 frame and are included in the STS-12 frame.

Furthermore, the interface card n which has received LAN data packets converts these packets into ATM cells. Therefore, the ATM cells are mapped to an STS-1 frame as shown in (6) of FIG. 7, and are input to the STS switching module.

Figure 8:
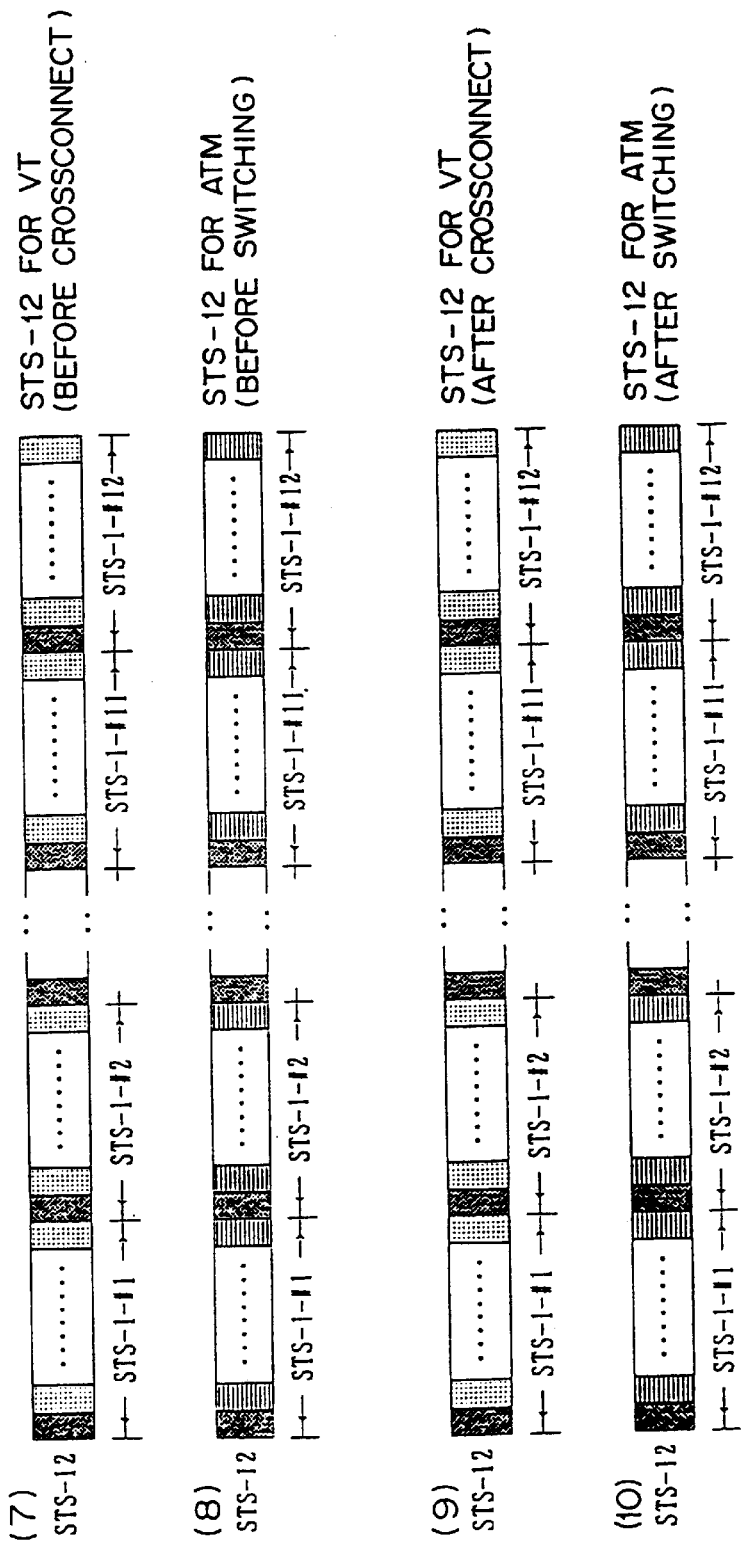
FIG. 8 is a diagram explaining how the data frame changes at each point in the configuration shown in FIG. 2 (No. 4)

FIG. 8 shows the appearances of data frames (No. 3).

(7) shown in this figure illustrates the STS-12 signal to which a VT signal is mapped, and illustrates the appearance of the data frame at the point (7) shown in FIG. 5. An operator recognizes beforehand that the VT signal is mapped to this STS-12 frame. Control is performed so that this signal is not switched by the STS switching module, and is input to the VT switching module unchanged according to the input from the centralized control module 32. In the meantime, the STS-12 frame shown in (8) of this figure, to which ATM cells are mapped, is input to the ATM switching module without being switched by the STS switching module according to the input from the centralized control module 32.

(9) shown in FIG. 8 illustrates the appearance of the data frame after passing through the VT switching module. Switching is made in VT frame units within the VT switching module. However, since the interface for the data frame must match that of the STS switching module, the data frame is converted into an STS frame. (9) exemplifies an STS-12 as an STS frame. This STS-12 includes 12 STS-1 frames, each of which includes a VT frame. Because the switching has been performed in VT units, the VT frames are accommodated in positions different from those within the STS frame when input, and are output.

Similarly, (10) shown in FIG. 8 illustrates the appearance of the data frame after passing through the ATM switching module. The data frame is switched in ATM frame units within the ATM switching module. However, it is mapped to an STS frame and is output. Similar to (9), the STS-12 frame includes 12 STS-1 frames, each of which includes ATM cells. Furthermore, since the ATM cells have been switched by the ATM switching module, the position which a particular ATM cell occupies is different from that of the ATM cell before being switched. Since the STS-12 frame is a synchronous signal frame, respective data are inserted in predetermined time slots and transmitted. Accordingly, a particular VT frame or a time slot including an ATM cell is different from that of (9) and (10) after the switching, or that of (7) and (8) before the switching.

Figure 9:
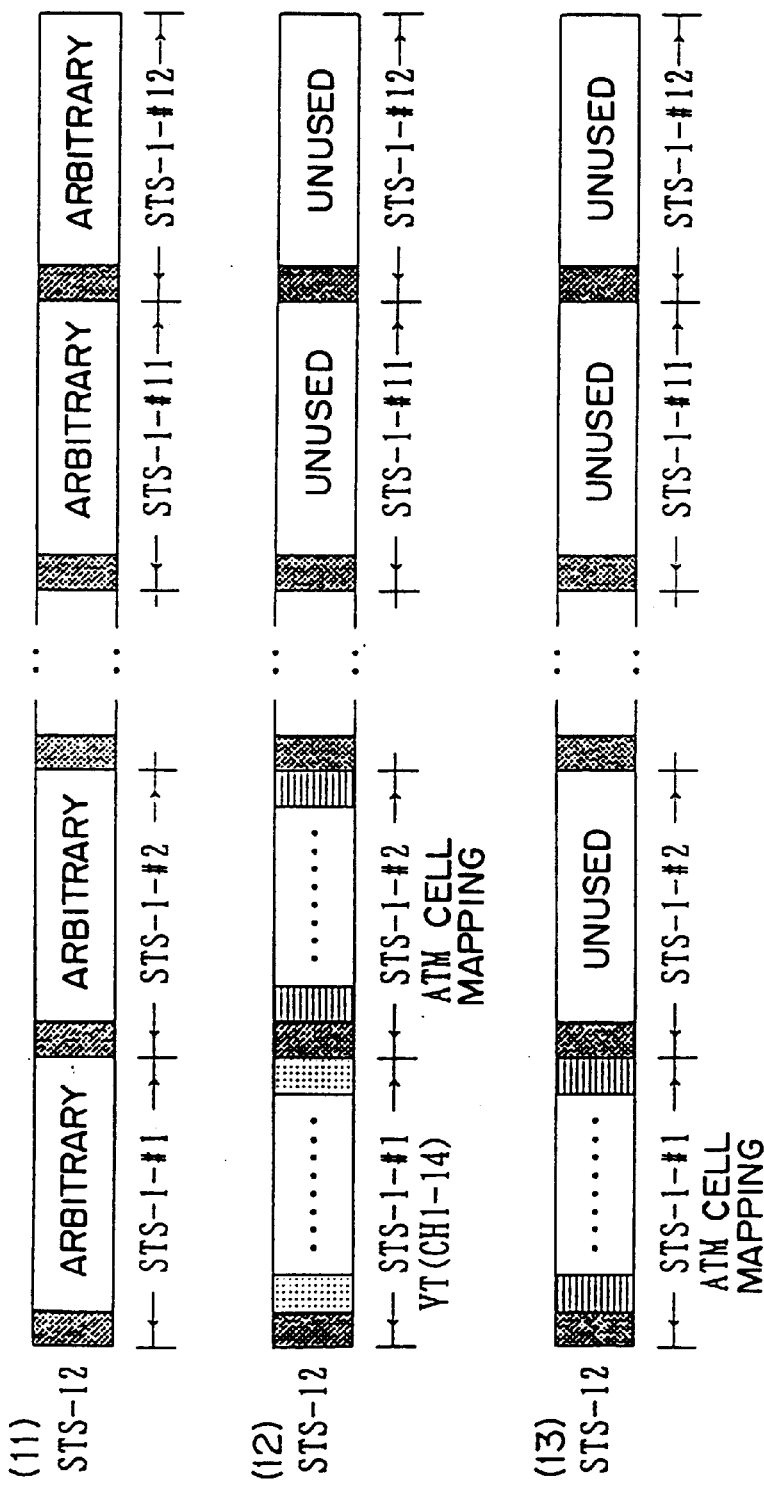
FIG. 9 is a diagram how the data frame changes at each point in the configuration shown in FIG. 2 (No. 5)

FIG. 9 shows the appearances of data frames (No. 4).

This figure shows the appearances of the data frames between the STS switching module and the interface cards 1' through n'. (11) shown in FIG. 9 illustrates the case where the signal input to the STM/ATM accessing device shown in FIG. 3 is a signal which uses a SONET STS frame as a unit. In this case, the switching is made by the STS switching module. The VT switching module and the ATM switching module are never passed through. Therefore, the switching is made in STS units. Namely, an STS frame (the STS-12 frame composed of 12 STS-1 frames in (11) shown in FIG. 9) where a payload includes data is switched unchanged, and output as it is.

(12) shown in FIG. 9 illustrates the case where the data frame is output via the STS switching module after being switched by the VT or the ATM switching module in VT or ATM cell units. Since the data frame is switched in the VT or the ATM cell units, the first STS-1 frame includes the VTs of the channels 1 through 14. The second STS-1 frame is mapped with ATM cells. Such STS-1 frames including unused frames form the STS-12 frame to be output.

(13) shown in FIG. 9 illustrates the frame output from the STS switching module when LAN packets are input. As described above, the LAN packets are converted into ATM cells by an interface card, and are input to the STM/ATM accessing device according to this preferred embodiment. Therefore, the ATM cells are switched and output by the ATM switching module. Accordingly, when being interfaced with the STS switching module, ATM cells are mapped to STS-1 frames in a similar manner as in the case where ATM cells are input. In this way, an STS-12 frame is structured by combining the STS-1 frame to which ATM cells are mapped and an unused STS-1 frame, which is transmitted from the STS switching module to the interface card.

Figure 10:
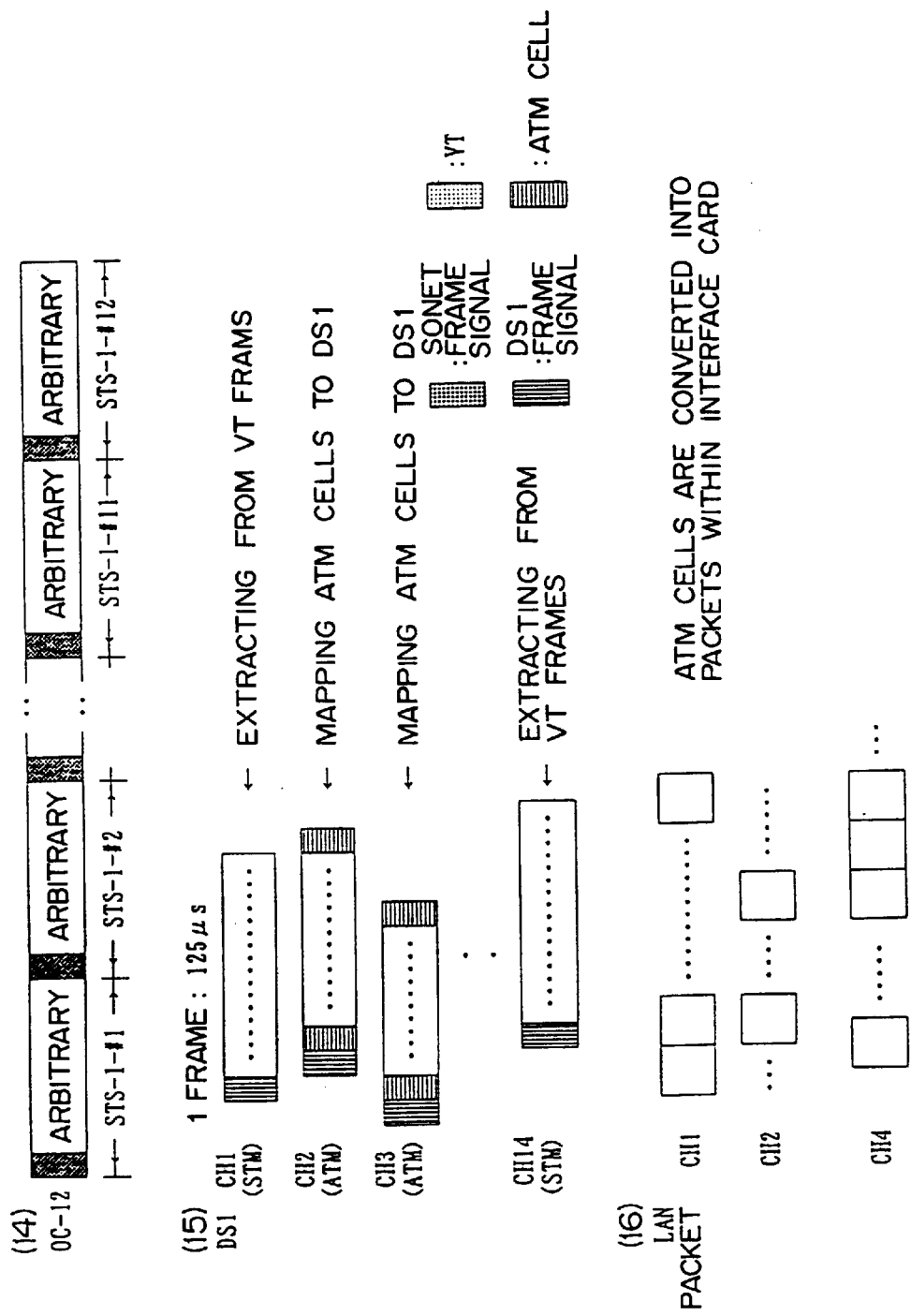
FIG. 10 is a diagram how the data frame changes at each point in the configuration shown in FIG. 2 (No. 6)

FIG. 10 shows the appearances of data frames (No. 5).

This figure shows the appearances of the data frames when data is converted within the interface cards 1' through n' in order to transmit the STS frame output from the STS switching module to a source communications network.

(14) shown in FIG. 10 illustrates the appearance of the data frame output from the interface card 1' after the optical signal input as an optical signal OC-12 is switched by the STM/ATM accessing device according to this preferred embodiment. Since the OC-12 originally uses an STS frame as its data frame, there is no need to particularly perform conversion. Therefore, the frame output from the STS switching module is output to a transmission line unchanged.

(15) shown in FIG. 10 illustrates the structure of the data frame output from the interface card 2' when an input data format is an STM or an ATM format. Because an STS-1 including a VT and an STS-1 including ATM cells are mixed in a single STS-12 frame in this case, the STS-12 frame is disassembled. For the STM signal, data is extracted from the VT frame. The STM signal is then converted into a DS1 signal and is transmitted. For the STS-1 frame including ATM cells, the ATM cells are mapped to a DS1 signal, which is then transmitted. Such a process is performed for all of the channels 1 through 14, and the data frames are transmitted to the transmission lines.

(16) shown in FIG. 10 illustrates the case where the signal input to the STM/ATM accessing device as LAN packets is returned from the interface card n' to the LAN. Since the LAN packets are converted into ATM cells and are switched within the STM/ATM accessing device, the ATM cells are inversely converted into LAN packets in this case. This conversion process is performed for all of the channels 1 through 4.

The above provided explanation refers to the system which converts ATM cells, etc. into an STS-12 frame, and then performs switching. The present invention, however, is not limited to the STS-12 frame, and a suitable STS frame may be adopted. As described above, an STS signal can be switched unchanged without being converted into a particular format by converting ATM cells, etc. into an STS frame, and at the same time, switching can be made in ATM cell or VT units by arranging a module which switches a signal in ATM cell or VT units. Especially, since the data format into which data in various formats are converted so as to integrally switch the data is not a special format but a standardized STS frame, the switching of a communications network which makes communications with the standardized data format, can be made unchanged. At the same time, a special data format is not adopted, which eliminates the need for manufacturing a special device at high cost. As a result, a compact and low-cost STM/ATM accessing device can be configured.

Figure 11:
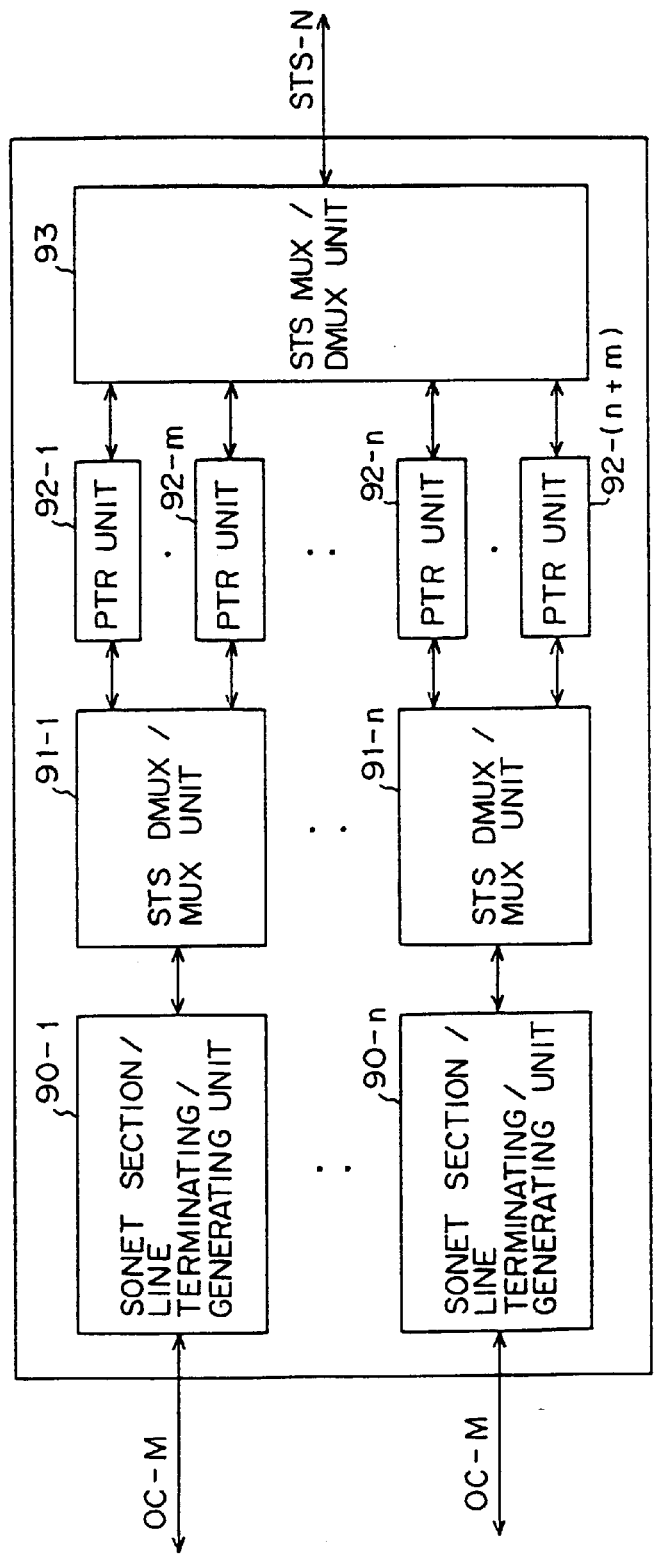
FIG. 11 is a block diagram exemplifying the configuration of an interface module which accommodates a variety of service signals (No. 1)
Figure 12:
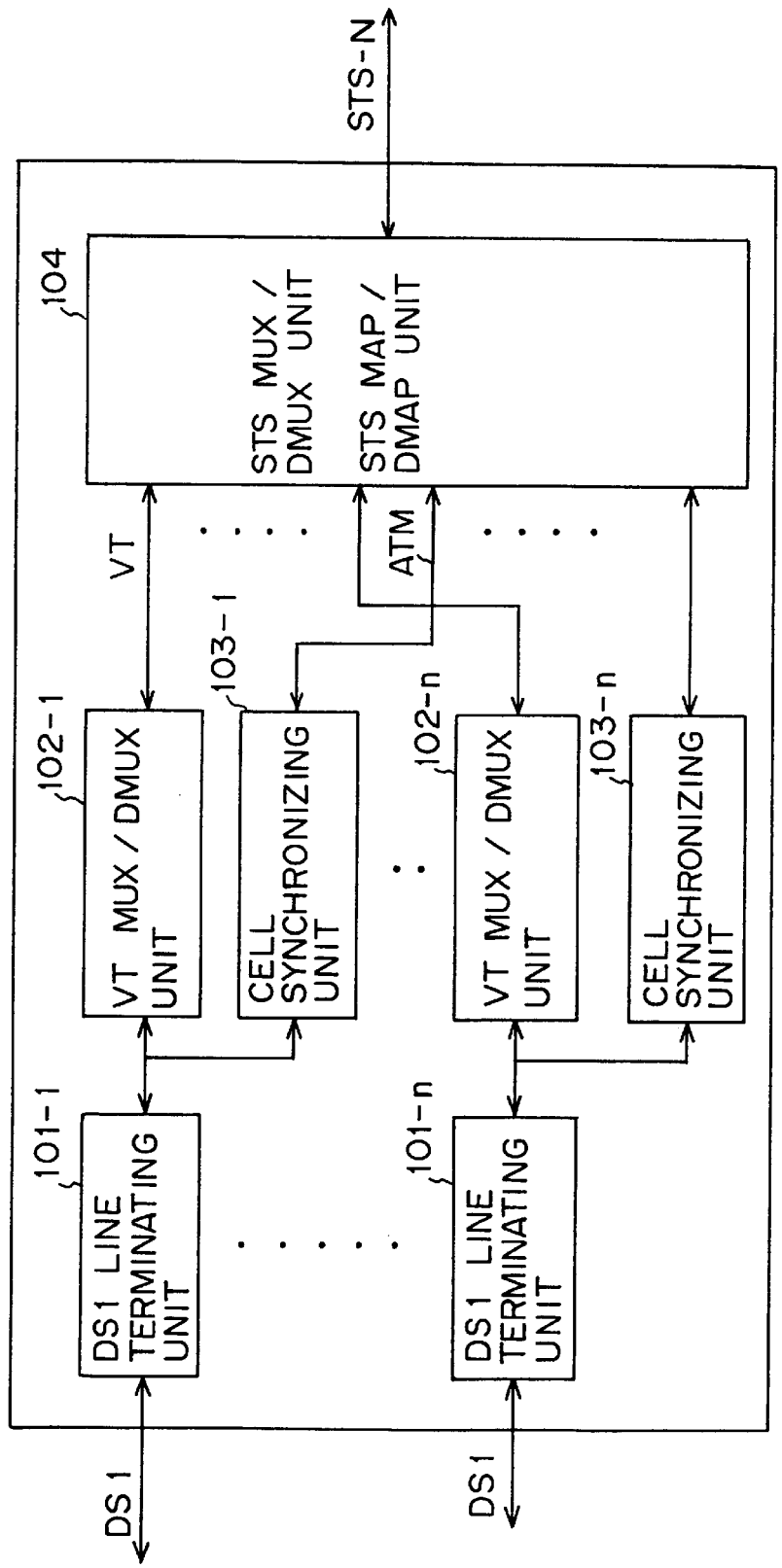
FIG. 12 is a block diagram exemplifying the configuration of the interface module which accommodates a variety of service signals (No. 2)
Figure 13:
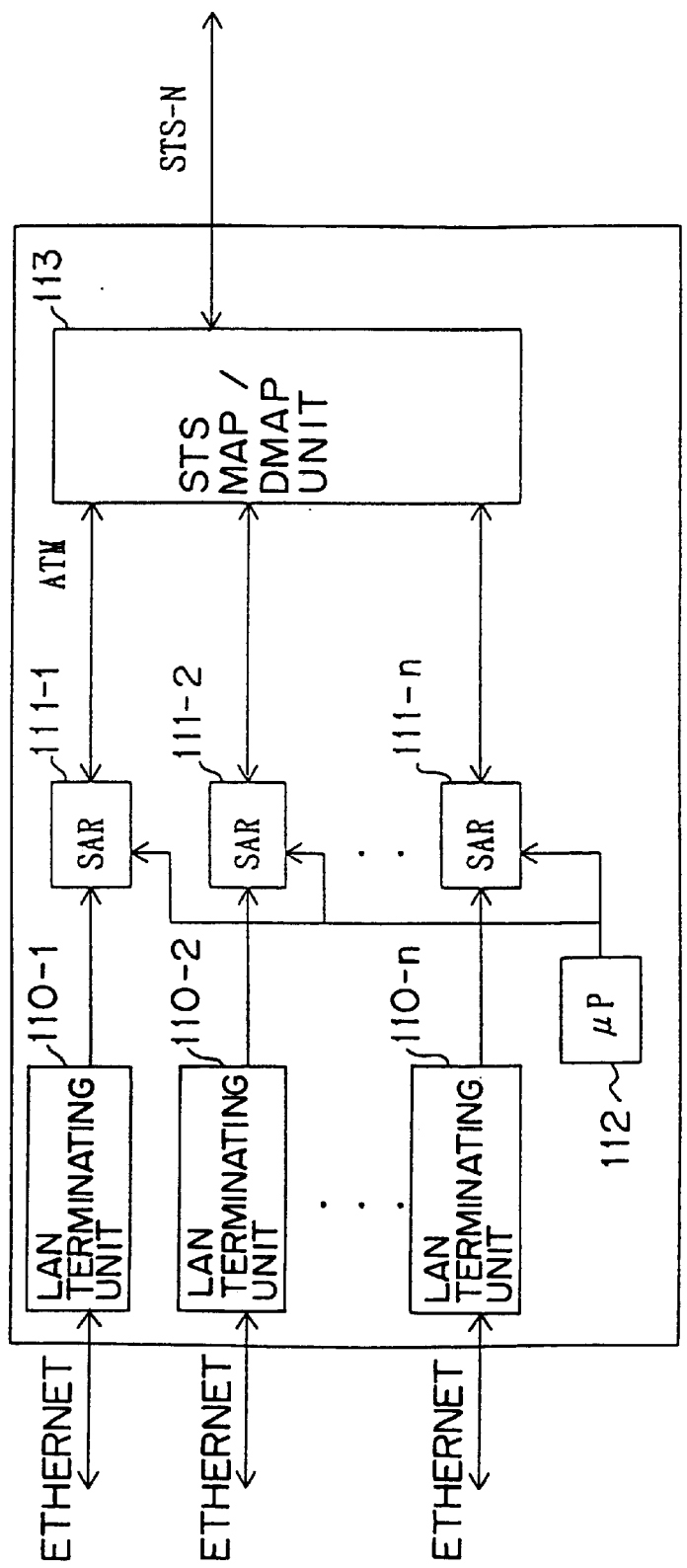
FIG. 13 is a block diagram exemplifying the configuration of the interface module which accommodates a variety of service signals (No. 3)

FIGS. 11 through 13 exemplify the configurations of interface modules which accommodate various types of service signals.

FIG. 11 shows the example of an interface module (card) which accommodates an OC-M signal. In this OC-M interface module, an OC-M signal is terminated by SONET section/line terminating/generating units 90-1 through 90-n when it is input. The terminated signal is converted into an electric signal and is transmitted to STS DMUX/MUX units 91-1 through 91-n. The STS DMUX/MUX units 91-1 through 91-n disassemble the SONET frame transmitted with the OC-M signal into STS-N (N=1, 3, 12) units. After the disassembled STS-N signals are pointer-processed by respective PTR units 92-1 through 92-(m+n) in order to prevent payloads from slipping, they are multiplexed into a single STS-N signal by an STS MUX/DMUX unit 93, which is connected to the STS switching module. The overhead information of the received SONET frame is transmitted to a centralized control unit (not shown). Conversely, the transmission overhead information is provided from the centralized control unit.

Conversely, upon receipt of an STS-N signal, the STS MUX/DMUX unit 93 disassembles this signal into STS-N (N=1, 3, 12) units, pointer-processed by the PTR units 92-1 through 92-(m+n), and multiplexed by the STS DMUX/MUX units 91-1 through 91-n. The multiplexed signal is converted into an OC-M signal which is an optical signal by the SONET section/line terminating/generating units 90-1 through 90-n, and is transmitted to a transmission line.

FIG. 12 shows the example of an interface module which accommodates a DS1 signal.

This figure shows a DS1 VT map/cell relay interface module. The signal which is input as a DS1 signal is terminated by DS1 line terminating units 101-1 through 101-n, each of which is arranged for each physical line. The signal output from the DS1 line terminating units 101-1 through 101-n is input to VT MUX/DMUX units 102-1 through 102-n and to cell synchronizing units 103-1 through 103-n. For the DS1 signal in this case, either VT mapping or an ATM cell relay service is arbitrarily set depending on the setting of a centralized control unit, which is not shown in this figure, for each physical port. After the DS1 signal is mapped to respective STS signals (for example, VT mapping is performed for an STS-1 #1 signal, while ATM mapping is performed for an STS-1 #2 signal), it is output from an STS MUX/DMUX (MAP/DEMAP) unit 104 as an STS-N signal, which is then input the STS switching module, not shown. The signal at each physical port is mapped to respective STS signals, so that it becomes possible to make arbitrary switching such as only STS switching, STS/VT switching, and STS/ATM switching.

Similarly, the DS1 signal which is input as an STS-N signal is disassembled into ATM cells or VT signals by the STS MUX/DMUX (MAP/DMAP) unit 104 for each STS signal. The disassembled signals are input to the VT MUX/DMUX units 102-1 through 102-n and the cell synchronizing units 103-1 through 103-n, which are arranged for respective lines. The input signals are set to be converted from a VT signal into a DS1 signal or from an ATM cell into a DS1 signal depending on an output physical line. At this time, any of the VT MUX/DMUX units 102-1 through 102-n and of the cell synchronizing units 103-1 through 103-n will operate and generate a DS1 signal. The generated DS1 signal is output from the DS1 line terminating units 101-1 through 101-n to a transmission line.

FIG. 13 shows the example of an interface module which accommodates LAN packets.

In this LAN interface module, a signal from a LAN such as an Ethernet, etc. is terminated by LAN terminating units 110-1 through 110-n for respective physical lines, and respective packets are put into ATM cells by SAR (Segment And Reassemble) units 111-1 through 111-n. After channel identifiers are assigned to the ATM cells according to the respective VPIs/VCIs, the ATM cells are mapped to an STS signal by an STS MAP/DMAP unit 113. The generated STS-N signal is then input to an STS switching module, not shown.

Conversely, if an STS-N signal accommodating LAN packets is input, the signal is disassembled into ATM cells by the STS MAP/DMAP unit 113 for respective physical lines. The disassembled ATM cells are then converted into LAN packets by the SAR units 111-1 through 111-n. The converted packets are transmitted by LAN terminating units 110-1 through 110-n to transmission lines of a LAN such as an Ethernet.

Note that this preferred embodiment uses STS-12 as an interface module or an inter-STS switching module interface. If a device includes the capability for adding/dropping a data service signal or a VT or an STS signal to which a conventional DS1 is mapped, it is desirable to use STS-N (N=1, 3, 12) as a shared format. As a result, the conditions of the connections to various interfaces on a backplane can be made common, and at the same time, both a conventional STS/VT access and an access with the STS signal to which ATM cell are mapped can be easily made in a similar manner. Consequently, the physical mounting position of an interface card can be flexibly arranged. Additionally, the signal processing by an STS switching module at a succeeding stage can be made common regardless of the type of an interface card.

To implement a "1+1" redundant configuration, a pair of interface cards of the same type are prepared and the circuit for selecting each STS-N signal is arranged within an STS switching module. As a result, a switching (selection) process can be automatically performed even if a fault on a connection link with another device, or a fault of the interface card itself occurs. Additionally, the pair of interface cards may be arranged as two independent interface cards depending on a user setting.

Figure 14:
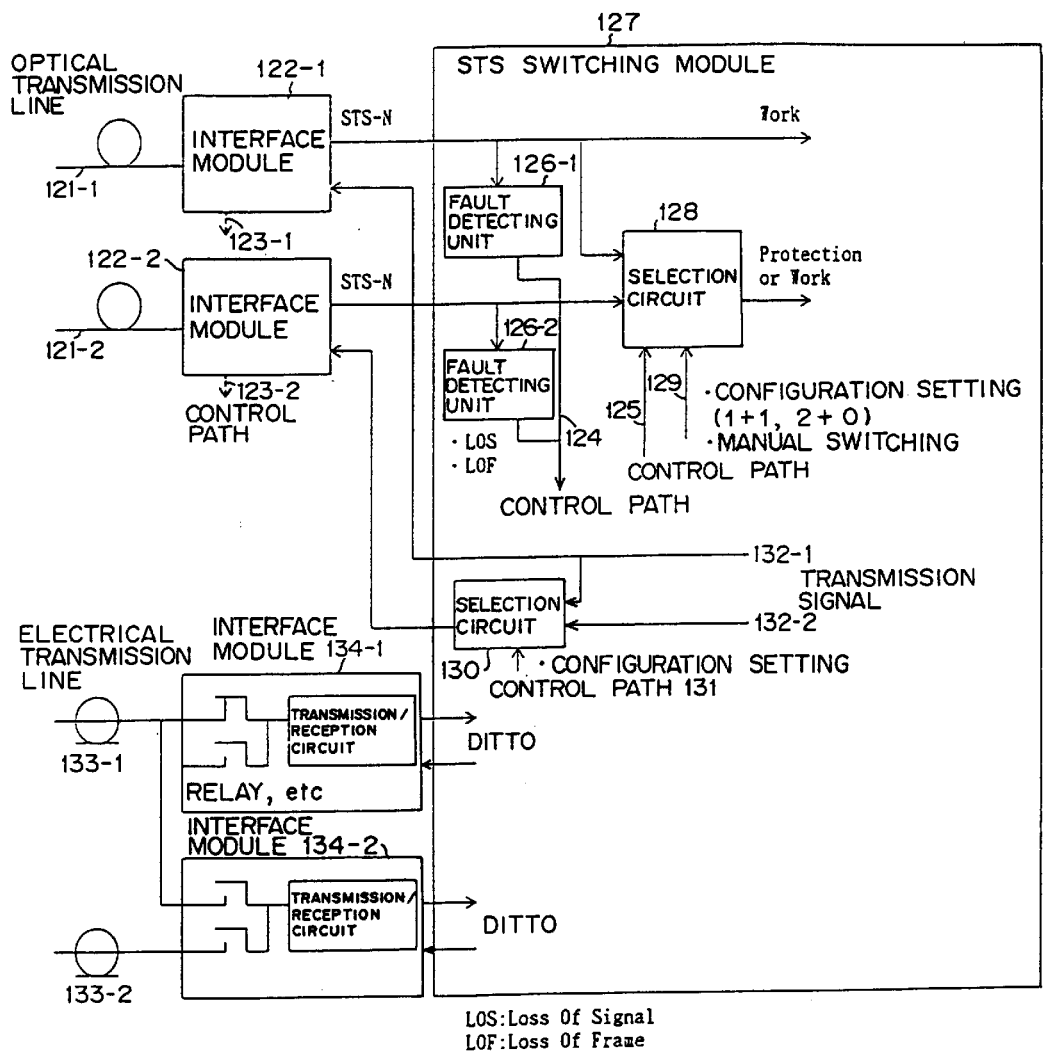
FIG. 14 is a schematic diagram explaining the redundant configuration of physical lines.

FIG. 14 is a schematic diagram explaining the redundant configuration of physical lines.

If the "1+1" redundant configuration is adopted, a single spare physical line is prepared for a single operating physical line. For example, an optical transmission line 121-1 is an operating physical line, while an optical transmission line 121-2 is a spare physical line in this figure. Furthermore, the configuration shown in this figure may be implemented as a "2+0" configuration where also a spare line is used as an operating line, if there is no need to adopt a redundant configuration.

Optical transmission lines 121-1 and 121-2 are connected to interface modules 122-1 and 122-2, respectively, which convert a transmitted signal into an STS-N signal and which are shared inter-module interfaces. The interface modules 122-1 and 122-2 extract fault information from a received signal, and provide a centralized control unit, not shown, with the extracted fault information via control paths 123-1 and 123-2. The centralized control unit determines whether or not to switch between an operating and a spare interface based on this fault information, and transmits a control signal. The STS-N signal output from the interface modules 122-1 and 122-2 branches and the branched signals are input to fault detecting units 126-1 and 126-2. The fault detecting units 126-1 and 126-2 detect a fault (LOS: Loss Of Signal/LOF: Loss Of Frame) within the STM/ATM accessing device including an STS switching module 127 and the interface modules 122-1 and 122-2. If a fault is detected to have occurred, its information is transmitted to a centralized control unit, which is not shown in this figure, via a control path 124, and the instruction for switching between an operating and a spare interface is issued.

Additionally, the STS-N signal from the interface modules 122-1 and 122-2 is input to a selection circuit 128, and the switching between an operating and a spare line is made based on the control signal from control paths 125 and 129. The optical transmission line 121-2 can be used as a spare line if the "1+1" redundant configuration is adopted, or can be used as an operating line if the "2+0" configuration is adopted.

Furthermore, in FIG. 14, also transmission signals 132-1 and 132-2 are transmitted to the optical transmission lines 121-1 and 121-2 via the interface modules 122-1 and 122-2. This is because input and output modules are mounted on a single board for each of the interface modules 122-1 and 122-2. Accordingly, the optical transmission lines 121-1 and 121-2 are configured to be a pair of upstream and downstream lines. Also a selection circuit 130 switches between an operating and a spare transmission line according to the control signal received from the control path 131. The above explanation describes that the switching between an operating and a spare transmission line is made according to the control signal from the control path. However, this control signal may be automatically generated by a centralized control module (not shown), or may be manually generated by an operator who is an administrator of the STM/ATM accessing device according to this preferred embodiment, so that the switching can be made.

Similarly, each of the interface modules 134-1 and 134-2 are configured to be on a single board for an upstream and a downstream line for electric transmission lines for transmitting electric signals such as a DS1 signal, etc. Because the process after the electric signal received from an electric transmission line is converted into an STS-N signal, or the process up to the input of the STS-N signal to the interface modules 134-1 and 134-2 is similar to the above described process, its explanation is omitted here. In this figure, the interface modules 134-1 and 134-2 themselves can be redundantly configured, and the switching can be made with a relay operation, etc. Since such a configuration can be easily realized by a person having ordinary skill in the art, its detailed explanation is omitted here. If a redundant configuration is adopted for interface modules 134-1 and 134-2, signals for use, signals can be properly transmitted even if any of transmission/reception circuits encounters a fault. Needless to say, also the interface modules 122-1 and 122-2 for optical transmission lines can adopt a redundant configuration in a similar manner.

For optical transmission lines, fibers 121-1 and 121-2 which are transmission media exist for respective interface modules 122-1 and 122-2. An optical transmission line fault is detected by the interface module 122-1 or 122-2, and is notified to a centralized control module via a control path 123-1 or 123-2. A fault of an inter-module interface is detected by a fault detecting unit 126-1 or 126-2, included in an STS exchange module 127 (two units are shown in this figure. Actually, however, the number of units according to the number of physical lines to be input is arranged). The centralized control module passes a switching trigger to the selection circuit 128 via the control path 125 according to the fault information, so that the switching is made. If the switching is not made, the selection circuit is passed through. The control path 129 makes the configuration setting such as "1+1", "2+0", etc., and the selection circuit 128 performs suitable switching. The output signals 132-1, 132-2, etc. on the transmission side (the direction from the device to the outside) are passed to the interface modules 122-1 and 122-2 via the selection circuit 130 for which the configuration setting is made by the control path 131. For example, if the "1+1" configuration is set, the output signal 132-1 is bridged and transmitted to both of the interface cards 122-1 and 122-2. If the "2+0" configuration is set, the signals 132-1 and 132-2 are respectively transmitted to the interface cards 122-1 and 122-2.

For electric transmission lines, they are not duplicated. Therefore, the switching method slightly differs. For example, if the "1+1" configuration using a DS3 signal is set, the DS3 signal 133-1 on the operating line side branches on a backplane, and the branched signals are input to both the interface module 134-1 on the operating side and the interface module 134-2 on the spare side. If the "2+0" configuration is set, that is, if respectively independent signals are carried, the DS3 signal 133-1 and the DS3 signal 133-2 are respectively input to the interface modules 134-1 and 134-2 in a one-to-one correspondence. These settings are implemented with a relay, etc. within the interface modules 134-1 and 134-2 according to the setting from the centralized control module.

Figure 15:
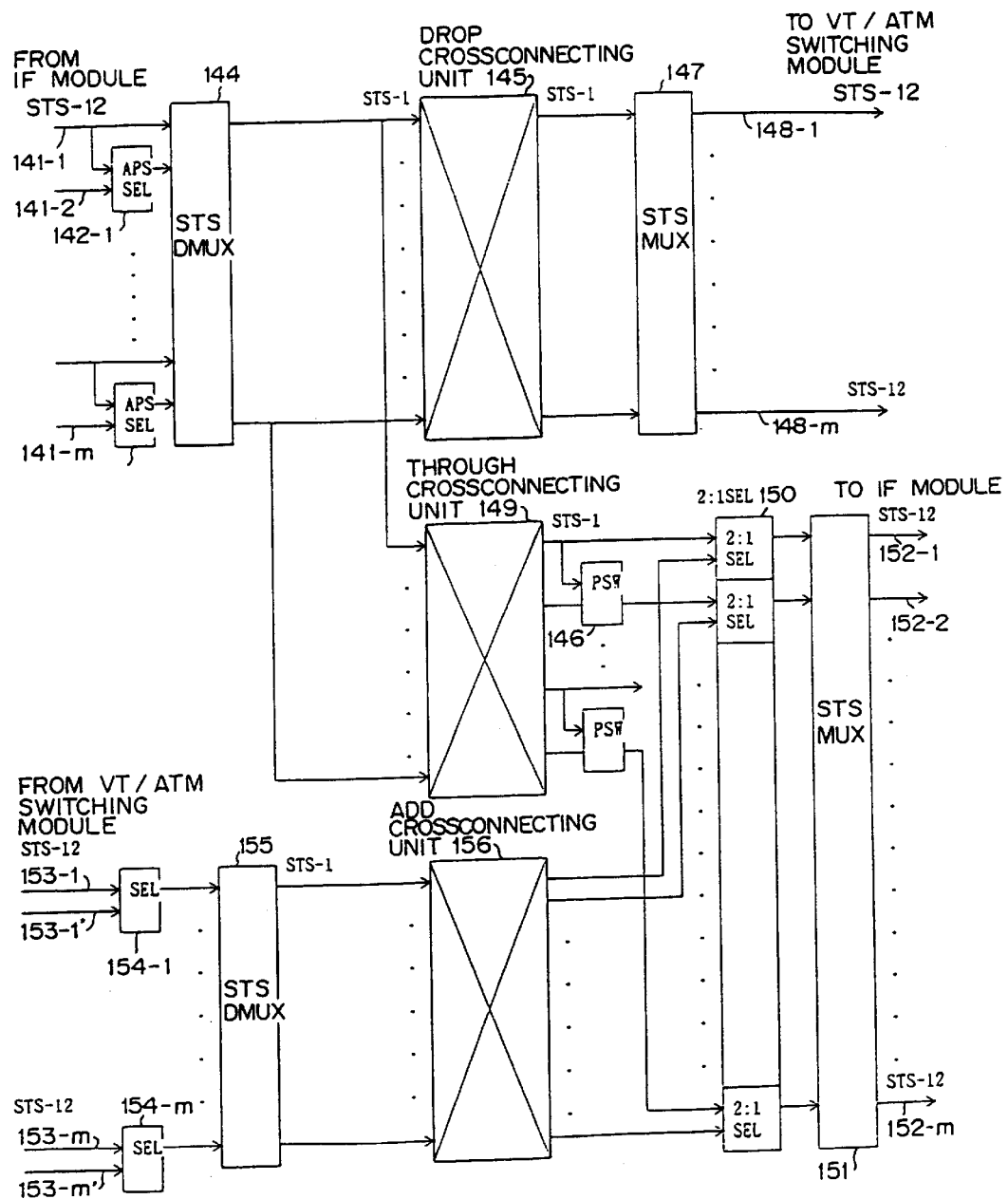
FIG. 15 shows the details of the configuration of an STS switching module.

FIG. 15 shows the details of the configuration of an STS switching module.

For example, a pair of signals 141-1 and 141-2 among shared inter-module interface input signals, that is, 141-1 through 141-m shown in this figure (which correspond to the signals 22-1 through 22-m shown in FIG. 4), are input an STS DMUX 144 after selection and switching operations are made by an APS SEL 142-1. Otherwise, these signals are input to the STS DMUX 144 directly or through the APS SEL. The STS DMUX 144 demultiplexes the signals from the STS-12 frames into STS-1 frames which are the minimum units of an STS crossconnect. The signal to be VT-switched is input to a DROP crossconnecting unit 145, which performs an STS level crossconnect operation. After an STS MUX 147 multiplexes the STS-1 frames, for example, into an STS-12 frame, the multiplexed signal is transmitted to both of an operating and a spare VT/ATM switching module via inter-module interfaces 148-1 through 148-m (26-1, . . . , 26-1' . . . , 27-1, 27-1', . . . , which are shown in FIG. 4).

If neither VT nor ATM switching is made, a through crossconnecting unit 149 performs an STS crossconnect operation. The signal is then input to an STS MUX 151 via a 2:1 SEL 150 unchanged or after being path-switched by a PSW 146 according to the setting. The signal is multiplexed, for example, into an STS-12 frame, and is transmitted from the shared inter-module interfaces 152-1 through 152-m to interface modules (IF modules), not shown.

Signals 153-1 through 153-m from the VT or the ATM switching modules and the signals 153-1' through 153-m' from the spare modules are selected by a selector 154, and demultiplexed to an STS-1 level (into STS-1 frames) by an STS DMUX 155. Then, the demultiplexed signals are STS-crossconnected by an ADD crossconnecting unit 156, selected by the 2:1 SEL 150, and are multiplexed, for example, into an STS-12 frame by an STS MUX 151. The multiplexed signal is then passed to interface modules via shared inter-module interfaces 152-1 through 152-n.

The 2:1 SEL 150 selects either the STS signal which passes through an STS switching module unchanged and is output, or the signal which is switched by a VT or an ATM switching module, for transmission to an interface module. An operator presets either of the two signals for each physical line with a centralized control module, not shown.

Figure 16:
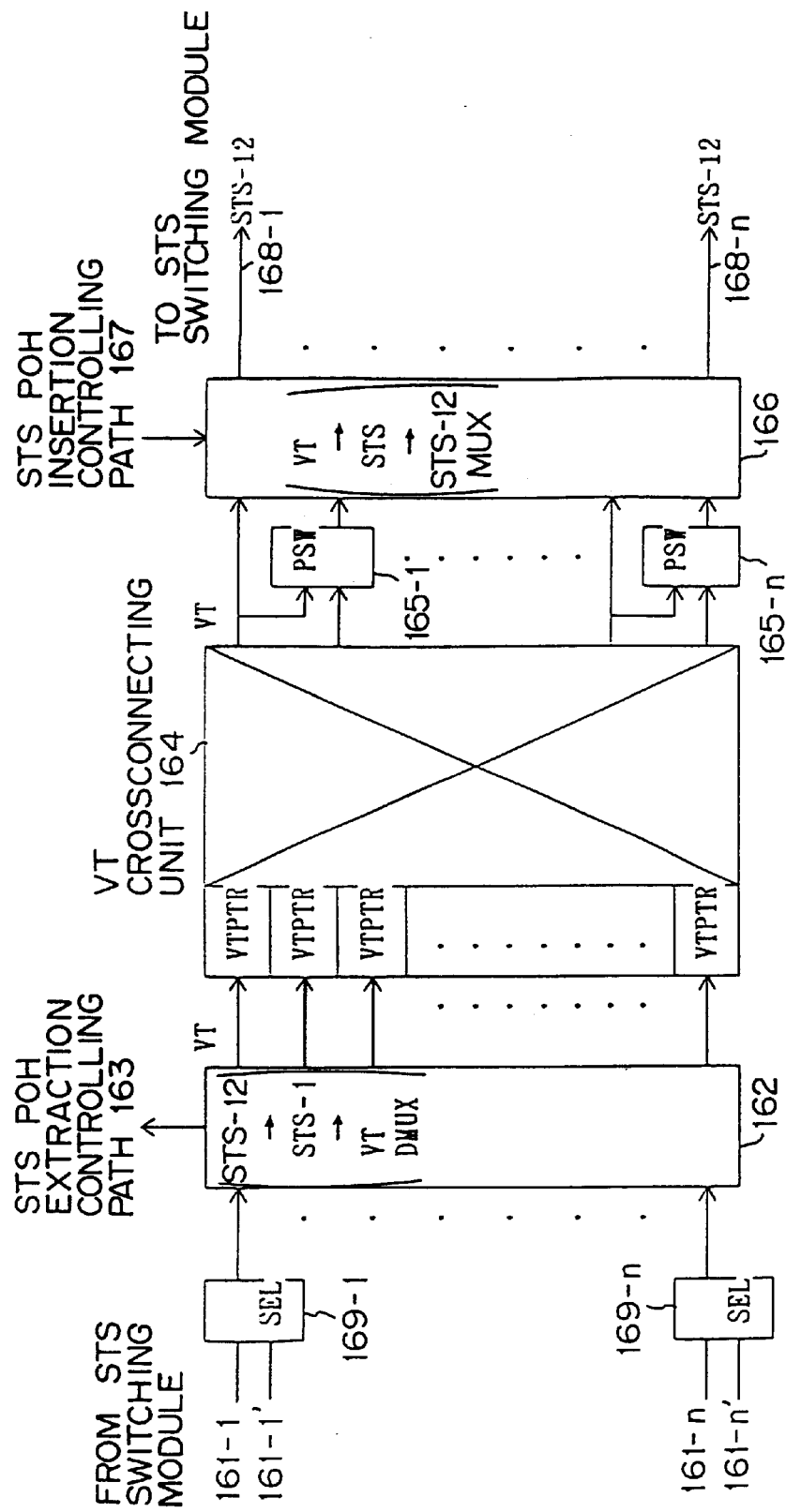
FIG. 16 shows the details of the configuration of a VT exchange module.

FIG. 16 shows the details of the configuration of the VT switching module.

In this configuration example, DROP signals 161-1 through 161-n (operating) and 161-1' through 161-n' (spare) (which correspond to 148-1 . . . ) are selected by SELs 169-1 through 169-n according to the switching information from a centralized control module (not shown), and are demultiplexed by a DMX 162 from STS-12 frames into STS-1 frames, and further from the STS-1 frames into VT frames. At this time, the information about STS POH (Path OverHead) is passed to the centralized control module via a control path 163. The VT level signals demultiplexed by the DMUX 162 are VT-pointer-processed by VT PTRs (VT pointers) and crossconnected at the VT level within a VT crossconnecting unit 164. Then, the signals are path-switched (between an operating and a spare path) by PSWs 165-1 through 165-n or made to pass through the PSWs according to the setting, and multiplexed from the VT frames into an STS frame by the MUX 166.

At this time, the STS POH information from the centralized control module is provided from a control path 167 and is added. Lastly, the multiplexed signal is returned to the STS switching module, not shown. Identical signals are transmitted to both of the operating and the spare STS switching modules (which correspond to 153-1 through 153-m and 153-1' through 153-m', which are shown in FIG. 15).

Figure 17:
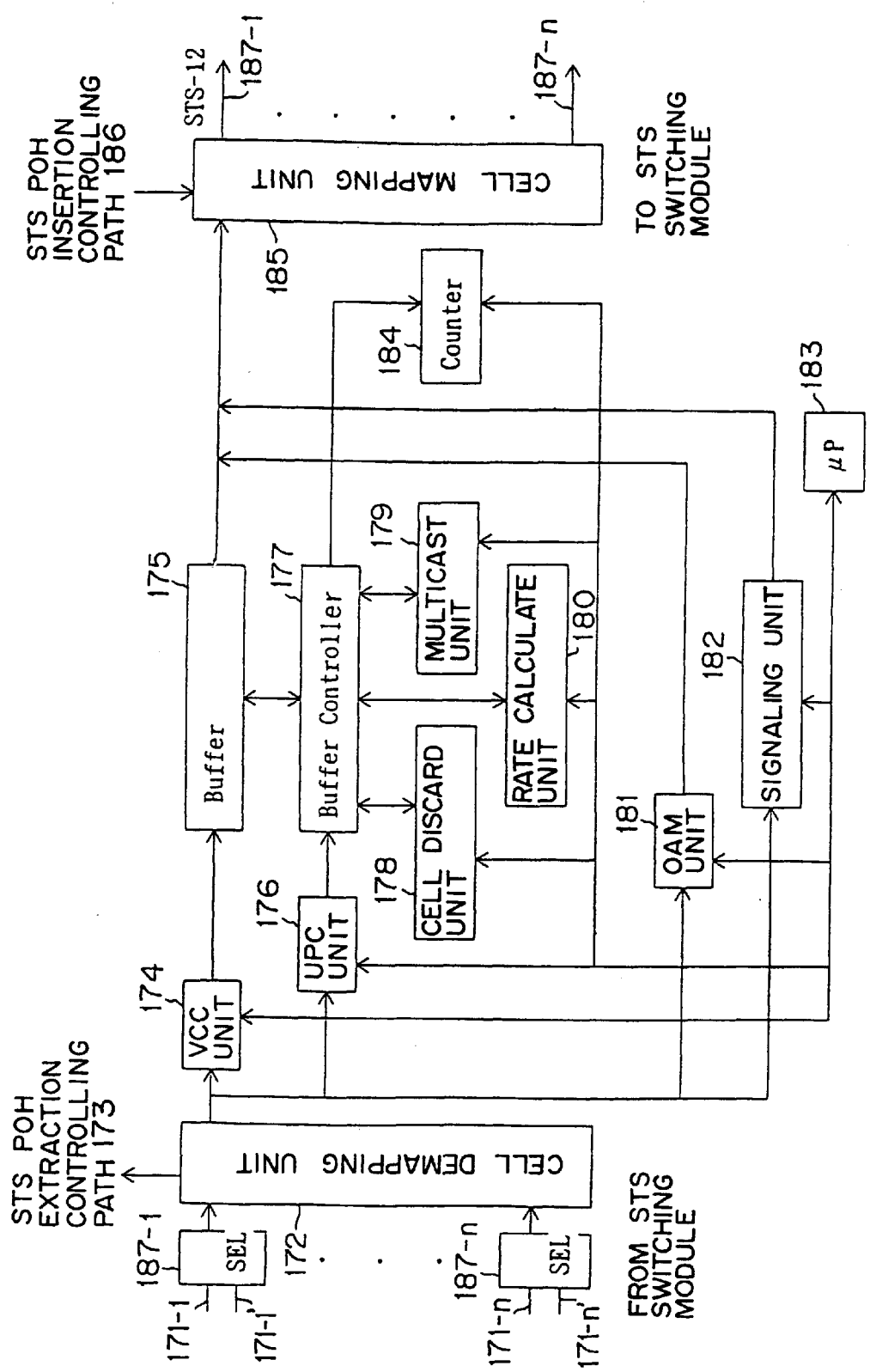
FIG. 17 shows the details of the configuration of an ATM switching module.

FIG. 17 shows the details of the configuration of the ATM switching module.

This configuration example is intended for a shared memory system. DROP signals 171-1 through 171-n (operating) and 171-1' through 171-n' (spare) from an STS switching module are selected by selectors SEL 187-1 through 187-n according to the switching information from a centralized control module, not shown, and the selected STS signal is terminated by a cell demapping unit 172. At the same time, the POH of the STS signal is extracted and passed to the centralized control module via a control path 173. The respective ATM cells extracted from the STS format are transmitted to the cell demapping unit 172, which distributes the ATM cells extracted from the STS format to a VCC unit 174, an OAM unit 181, and a signaling unit 182. An information cell is transmitted to the VCC unit 174. After the information such as a VPI/VCI, etc. are read by a microprocessor 183, the cell is temporarily stored in a buffer 175. The cell which is temporarily stored in the buffer 175 is read by the microprocessor 183, and its VPI/VCI is converted according to a VPI/VCI conversion table. The cell is then allocated to a suitable time slot according to the VPI/VCI. The cell is converted into an STS format by a cell mapping unit 185, and is transmitted from shared inter-module interfaces 187-1 through 187-n to the STS switching module, not shown. At this time, identical signals are transmitted to both of an operating and a spare STS switch module. An OAM cell is terminated by the OAM unit 181. OAM information is notified to the microprocessor 183. Then, different OAM information is notified from the microprocessor 183 to the OAM unit 181, converted into an OAM cell, and is transmitted to a transmission line. A signaling cell is terminated by the signaling unit 182. Signaling information is notified to the microprocessor 183. Then, different signaling information is notified from the microprocessor 183 to the signaling unit 182, converted into a signaling cell, and is transmitted to a transmission line. A UPC (Usage Parameter Control) unit 176 counts the traffic of each VC with a counter 184. Cell discarding or a CLP (Cell Loss Priority) change is made by a cell discarding unit 178 depending on the setting. A rate calculating unit 180 collects various items of statistical information. A multicasting unit 179 performs the process of point-to-multipoint topology. The ATM cell switching process within the buffer 175 is performed under the control of a buffer controller 177 at any time.

Figure 18:
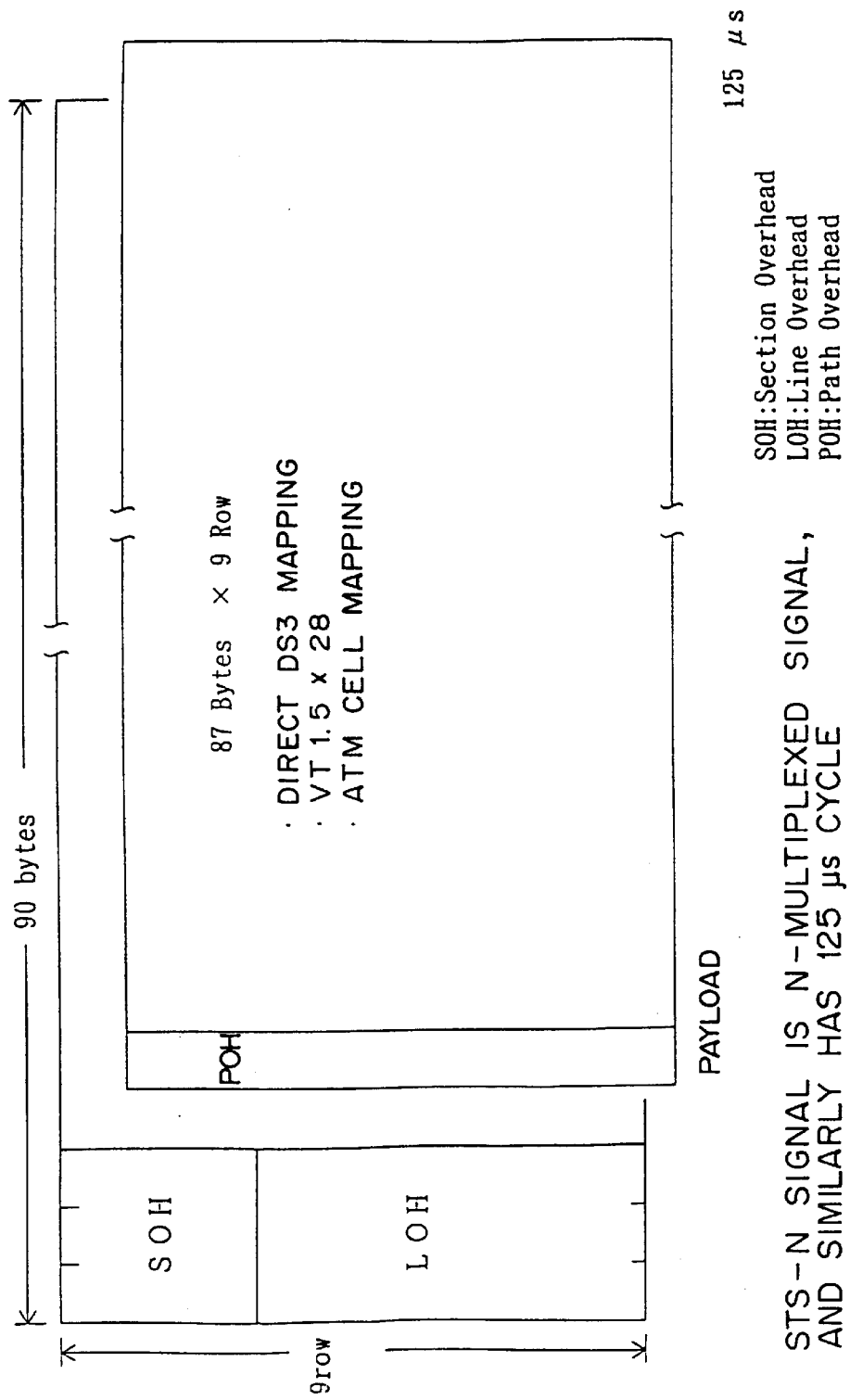
FIG. 18 shows the format of an STS-N signal.

FIG. 18 shows the format of an STS-N signal.

An STS path monitor circuit is arranged for an STS switching module, while a VT path monitor circuit is arranged for a VT switching module. These monitor circuits continuously monitor a pair of a working and a protection path, thereby providing a path protection switching capability by automatically selecting a suitable path. This capability is the same as a path protection switching capability used in a current SONET transmission network. With this capability, a switching operation is performed by using as a trigger a path AIS signal or a path fault such as a parity error (a B3/BIP-2 error: arranged in the overhead of an STS format signal. Its use purpose is standardized by the ITU-T.) of a path exceeding a threshold value. Since the interfaces of the above described VT and ATM switching modules on the backplane are common, these modules can be arranged in both mounting blocks for the VT switching module and ATM switching module, so that all signals can be used for VT or ATM accesses.

An operating and a spare switching module of each module (such as an STS, a VT, or an ATM switching module) have separate modular configurations. Therefore, switching to a spare module can be made for each module when a fault occurs, thereby minimizing the influence by the switching when a fault occurs. For example, if a fault occurs in an ATM switch and the ATM switch module switching is made, it has no influence on an STS and a VT switch. Additionally, if a flexible switch menu configuration is made possible without wasting hardware resources, and a "2+0" configuration is adopted if a redundant configuration is not required, that a switch capacity can be doubled in a single device.

As described above, the switching at an ATM cell level can be flexibly made within a single device in addition to the add/drop capability of STM signals (STS and VT signals), which is implemented by a conventional SONET ADM. Additionally, the capacity of an interface can be configured by arbitrarily combining STM/ATM interfaces. Furthermore, even if a device is configured to provide only an STM or ATM service, it can be made compact at a lower cost than the costs of conventional dedicated devices. Still further, a redundant configuration for ensuring the tolerance of a service when a fault occurs on a link or in hardware, can be flexibly adopted/provided according to a device configuration requested by a network.

The present invention provides a SONET/SDH capability equivalent to that of a conventional SONET/SDH transmission device on an equivalent scale and at an equivalent cost, and provides a device which can flexibly and gradually add an ATM switch access capability depending on need.

What is claimed is:

1. A transmission device comprising:

interface means for supporting at least a synchronous communications network, an asynchronous communications network, and a data service;

switching means for performing a process for switching all or any of a frame level of the synchronous communications network, a low layer frame level of the synchronous communications network, and a frame level of the asynchronous communications network; and centralized control means for performing various controls including a switching control when said interface means and said switching means have a redundant configuration, the transmission device serving as a transmission device dedicated to the synchronous communications network, a switching transmission device dedicated to the asynchronous communications network or a synchronous/asynchronous hybrid switching transmission device by combining said interface means, said switching means, and said centralized control means, wherein said switching means includes:

a first switching module for switching a frame of the synchronous communications network;

a second switching module for switching a low layer frame of the synchronous communications network; and a third switching module for switching a frame of the asynchronous communications network, wherein each of said first through third switching modules independently makes switching when a fault occurs, by configuring each of said first through third switching modules to be redundant and said centralized control means controls the independent switching of the switching modules when a fault occurs wherein:

said first switching module is an STS switching module for making switching in SONET STS units;

said second switching module is a VT switching module for making switching in VT units;

said third switching module is an ATM switching module for making switching in ATM cell units; and all signals are converted into STS signals, and switched after conversion from STS signals to appropriate signals if necessary.

2. The transmission device according to claim 1, wherein inter-module interface signals between said first through third switching modules are made common, so that a plurality of types of interfaces can be arranged at arbitrary positions among positions at which interfaces must be arranged, and different types of switching modules can be arranged at a same position.

3. The transmission device according to claim 1, wherein each of said switching modules can be added depending on a use purpose of a service which requires the ATM switching module or the VT switching module and on a capacity, by allowing positions at which different types of switching modules are arranged to be the same.

4. The transmission device according to claim 1, further comprising a control module for collecting fault information of each of said switching modules, and for controlling switching of each of said switching modules, wherein each type of an interface module and each of a plurality of types of switching modules can be arbitrarily configured to be a "1+1" redundant configuration or a non-redundant configuration by common inter-module interfaces.

5. The transmission device according to claim 4, wherein if said first through third switching modules select a non-redundant configuration, a switching capacity can be double a capacity implemented when a redundant configuration is adopted.

6. The transmission device according to claim 1, wherein all signals converted by said interface means are input to the STS switching module, and are arbitrarily distributed as a signal which is switched within the STS switching module unchanged and again connected to said interface means, a signal which is connected to the VT switching module, switched on a VT level, and again connected to said interface means via the STS switching module, and a signal which is connected to the ATM switching module, ATM-switched, and again connected to said interface means via the STS switching module.

7. A transmission device comprising:

interface means for supporting at least a synchronous communications network, an asynchronous communications network, and a data service, and all signals are converted into STS signals;

switching means for performing a process for switching all or any of a frame level of the synchronous communications network, a low layer frame level of the synchronous communications network, and a frame level of the asynchronous communications network, and all signals switched after conversion from STS signals to appropriate signals if necessary; and centralized control means for performing various controls including a switching control when said interface means and said switching means have a redundant configuration, the transmission device serving as a transmission device dedicated to the synchronous communications network, a switching transmission device dedicated to the asynchronous communications network or a synchronous/asynchronous hybrid switching transmission device by combining said interface means, said switching means, and said centralized control means, wherein said switching means includes:

an STS switching module for switching a frame of the synchronous communications network in SONET STS units;

a VT switching module for switching a low layer frame of the synchronous communications network in VT units; and an ATM switching module for switching a frame of the asynchronous communications network in ATM cell units, wherein each of said first through third switching modules independently makes switching when a fault occurs, by configuring each of said first through third switching modules to be redundant.

* * * * *